United States Patent
Yien et al.

(10) Patent No.: US 10,867,291 B1
(45) Date of Patent: Dec. 15, 2020

(54) REMOTE ASSOCIATION OF PERMISSIONS FOR PERFORMING AN ACTION

(71) Applicant: Square, Inc., San Francisco, CA (US)

(72) Inventors: Kevin Yien, Manhasset, NY (US); Amar Dhingra, New York, NY (US); David Arvelo, New York, NY (US); Matthew T. Kursmark, New York, NY (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/203,545

(22) Filed: Nov. 28, 2018

(51) Int. Cl.
*G06Q 20/00* (2012.01)
*G06F 17/00* (2019.01)
*H04L 29/06* (2006.01)
*G06Q 20/20* (2012.01)
*G06Q 20/32* (2012.01)
*G06Q 20/40* (2012.01)
*G06F 21/30* (2013.01)

(52) U.S. Cl.
CPC ......... *G06Q 20/206* (2013.01); *G06F 21/305* (2013.01); *G06Q 20/3224* (2013.01); *G06Q 20/401* (2013.01)

(58) Field of Classification Search
USPC .......................................... 705/16, 18; 726/1
See application file for complete search history.

(56) References Cited

U.S. PATENT DOCUMENTS

| 5,819,231 A | 10/1998 | Tremaine |
| 5,878,337 A | 3/1999 | Joao et al. |

(Continued)

FOREIGN PATENT DOCUMENTS

| AU | 2018201228 A1 | 3/2018 |
| EP | 0 993 191 A2 | 4/2000 |

(Continued)

OTHER PUBLICATIONS

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.

(Continued)

*Primary Examiner* — Ariel J Yu
(74) *Attorney, Agent, or Firm* — Lee & Hayes, P.C.

(57) ABSTRACT

Systems and processes for remote provisioning of manager approval are described. A point-of-sale application on a worker mobile device can send a request for manager approval to perform a transaction-related action for which a worker lacks sufficient permissions. A manager application on a remote manager device can display a notification of the request and can also present additional information regarding the request (and historical requests), including a queue of pending requests that can be generated and updated according to priority rules and transaction conditions. The manager application receives an indication of the manager's approval to the worker mobile device. In response, the worker mobile device can automatically perform the action. In some configurations, an intermediate device (e.g., a local or remote server device) can execute the manager application and can add data and capabilities to the system and processes.

20 Claims, 17 Drawing Sheets

(56) References Cited

U.S. PATENT DOCUMENTS

| | | | |
|---|---|---|---|
| 6,571,218 B1* | 5/2003 | Sadler | G06Q 20/20 235/462.01 |
| 6,873,964 B1 | 3/2005 | Williams et al. | |
| 7,209,891 B1 | 4/2007 | Addy et al. | |
| 7,764,185 B1 | 7/2010 | Manz et al. | |
| 7,810,729 B2 | 10/2010 | Morley, Jr. | |
| 7,870,028 B2 | 1/2011 | Kloubakov et al. | |
| 8,001,057 B1 | 8/2011 | Hill | |
| 8,442,208 B2 | 5/2013 | Shaffer et al. | |
| 8,478,618 B2 | 7/2013 | Coleman et al. | |
| 8,601,002 B1 | 12/2013 | Ali et al. | |
| 9,064,285 B1 | 6/2015 | Nathoo | |
| 9,727,827 B2 | 8/2017 | Hyder et al. | |
| 9,824,323 B1 | 11/2017 | Weiss et al. | |
| 9,882,914 B1* | 1/2018 | Co | H04L 63/105 |
| 10,515,342 B1 | 12/2019 | Haley | |
| 2002/0022982 A1 | 2/2002 | Cooperstone et al. | |
| 2003/0120531 A1 | 6/2003 | Parker | |
| 2003/0204447 A1 | 10/2003 | Dalzell et al. | |
| 2005/0192823 A1 | 9/2005 | Kuhn et al. | |
| 2006/0047530 A1 | 3/2006 | So et al. | |
| 2006/0138219 A1 | 6/2006 | Brzezniak et al. | |
| 2006/0243798 A1 | 11/2006 | Kundu et al. | |
| 2007/0038503 A1 | 2/2007 | Krajcev et al. | |
| 2007/0039024 A1 | 2/2007 | Krajcev et al. | |
| 2007/0204156 A1 | 8/2007 | Jeghers | |
| 2007/0208572 A1 | 9/2007 | Habichler et al. | |
| 2007/0233540 A1* | 10/2007 | Sirota | H04L 63/105 705/7.25 |
| 2007/0239468 A1 | 10/2007 | O'Brien et al. | |
| 2007/0272734 A1 | 11/2007 | Lipton et al. | |
| 2008/0120129 A1 | 5/2008 | Seubert et al. | |
| 2008/0177624 A9 | 7/2008 | Dohse | |
| 2008/0197188 A1 | 8/2008 | Jagatic et al. | |
| 2008/0255929 A1 | 10/2008 | Mouton | |
| 2008/0306750 A1 | 12/2008 | Wunder et al. | |
| 2009/0094239 A1 | 4/2009 | Sabol et al. | |
| 2009/0144102 A1 | 6/2009 | Lopez | |
| 2009/0210331 A1 | 8/2009 | Boone et al. | |
| 2009/0303040 A1* | 12/2009 | Srinivasa | G08B 13/248 340/540 |
| 2009/0320088 A1* | 12/2009 | Gill | G06F 21/604 726/1 |
| 2010/0211469 A1 | 8/2010 | Salmon et al. | |
| 2010/0269059 A1 | 10/2010 | Othmer et al. | |
| 2011/0131105 A1 | 6/2011 | Aonuma et al. | |
| 2012/0130774 A1 | 5/2012 | Ziv et al. | |
| 2012/0173570 A1 | 7/2012 | Golden | |
| 2012/0266258 A1 | 10/2012 | Tuchman et al. | |
| 2013/0067547 A1 | 3/2013 | Thavasi et al. | |
| 2013/0132140 A1 | 5/2013 | Amin et al. | |
| 2013/0132246 A1 | 5/2013 | Amin et al. | |
| 2013/0132274 A1 | 5/2013 | Henderson et al. | |
| 2013/0132887 A1 | 5/2013 | Amin et al. | |
| 2013/0151705 A1* | 6/2013 | Menon | G06Q 10/1053 709/226 |
| 2013/0159154 A1 | 6/2013 | Purves et al. | |
| 2013/0246207 A1 | 9/2013 | Novak et al. | |
| 2013/0246301 A1 | 9/2013 | Radhakrishnan et al. | |
| 2013/0262479 A1 | 10/2013 | Liang et al. | |
| 2013/0301820 A1 | 11/2013 | Williams et al. | |
| 2013/0311836 A1 | 11/2013 | Hurst et al. | |
| 2013/0325734 A1 | 12/2013 | Bixler et al. | |
| 2014/0032382 A1 | 1/2014 | Hamann et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0201001 A1 | 7/2014 | Rellas et al. | |
| 2014/0201100 A1 | 7/2014 | Rellas et al. | |
| 2014/0207500 A1 | 7/2014 | Krajcev et al. | |
| 2014/0258161 A1 | 9/2014 | Brown et al. | |
| 2014/0279102 A1 | 9/2014 | Hartman et al. | |
| 2014/0358803 A1 | 12/2014 | Carter et al. | |
| 2015/0161665 A1 | 6/2015 | Grimes et al. | |
| 2015/0172327 A1 | 6/2015 | Wansley et al. | |
| 2015/0213413 A1 | 7/2015 | Faron et al. | |
| 2015/0242922 A1 | 8/2015 | Zamer | |
| 2015/0269508 A1* | 9/2015 | Damboritz | G06Q 50/22 705/2 |
| 2015/0332242 A1 | 11/2015 | Perry et al. | |
| 2016/0055322 A1* | 2/2016 | Thomas | G06F 21/10 726/7 |
| 2016/0071038 A1 | 3/2016 | Puttaswamy et al. | |
| 2016/0071121 A1 | 3/2016 | Gestetner et al. | |
| 2016/0171516 A1 | 6/2016 | Brosnan et al. | |
| 2016/0217470 A1 | 7/2016 | Gerard et al. | |
| 2016/0224205 A1 | 8/2016 | Fulton | |
| 2016/0239806 A1 | 8/2016 | Benham et al. | |
| 2016/0328715 A1 | 11/2016 | Gideoni et al. | |
| 2017/0316382 A1 | 11/2017 | Colner | |
| 2018/0260768 A1 | 9/2018 | Ng et al. | |
| 2019/0258818 A1* | 8/2019 | Yu | G06F 21/6245 |

FOREIGN PATENT DOCUMENTS

| | | |
|---|---|---|
| WO | 02/44981 A1 | 6/2002 |
| WO | 2016/011287 A1 | 1/2016 |
| WO | 2018/164839 A1 | 9/2018 |

OTHER PUBLICATIONS

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.

Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

"Online Shopping," dated Nov. 2, 2014, Retrieved from the Internet URL: http://en.wikipedia.org/wiki/Online_shopping, on Nov. 10, 2014, pp. 1-12.

"Payment Gateway," Wikipedia, published May 30, 2014, Retrieved from the Internet URL: http://en.wikipedia.org/wiki/Payment gateways, on Jun. 6, 2014, pp. 1-3.

"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.

Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

Non-Final Office Action dated Oct. 28, 2014, for U.S. Appl. No. 14/334,422, of Nathoo, A., filed Jul. 17, 2014.

Notice of Allowance dated Feb. 18, 2015, for U.S. Appl. No. 14/334,422, of Nathoo, A., filed Jul. 17, 2014.

Non-Final Office Action dated Mar. 2, 2015, for U.S. Appl. No. 14/177,177, of Brock, Z., et al., filed Feb. 10, 2014.

Final Office Action dated Oct. 19, 2015, for U.S. Appl. No. 14/177,177, of Brock, Z., et al., filed Feb. 10, 2014.

First Examination Report for Australian Patent Application No. 2015289554, dated Feb. 21, 2017.

Examiner Requisition for Canadian Patent Application No. 2,955,452, dated Dec. 29, 2017.

Second Examination Report for Australian Patent Application No. 2015289554, dated Feb. 8, 2018.

Non-Final Office Action dated Feb. 28, 2018, for U.S. Appl. No. 14/754,909, of Tsou, V., filed Jun. 30, 2015.

Final Office Action dated Jul. 16, 2018, for U.S. Appl. No. 14/754,909, of Tsou, V., filed Jun. 30, 2015.

(56) References Cited

OTHER PUBLICATIONS

Examiner Requisition for Canadian Patent Application No. 2,955,452, dated Oct. 23, 2018.
Non-Final Office Action dated Jan. 10, 2019, for U.S. Appl. No. 15/630,769 of Haley, E., filed Jun. 22, 2017.
First Examination Report for Australian Patent Application No. 2018201228, dated Feb. 26, 2019.
Non-Final Office Action dated Mar. 4, 2019, for U.S. Appl. No. 15/476,740 of Ho, V., et al., filed Mar. 31, 2017.
International Search Report and Written Opinion for International Application No. PCT/US2015/040800, dated Oct. 30, 2015.
International Search Report and Written Opinion for International Application No. PCT/US2018/018950, dated Apr. 12, 2018.
Non-Final Office Action dated May 30, 2019, for U.S. Appl. No. 14/754,909, of Tsou, V., filed Jun. 30, 2015.
Non-Final Office Action dated Jun. 14, 2019, for U.S. Appl. No. 15/454,892, of Ng, C., et al., filed Mar. 9, 2017.
Second Examination Report for Australian Patent Application No. 2018201228, dated Jul. 15, 2019.
Final Office Action dated Jul. 30, 2019, for U.S. Appl. No. 15/476,740, of Ho, V., et al., filed Mar. 31, 2017.
Notice of Allowance dated Aug. 2, 2019, for U.S. Appl. No. 15/630,769, of Haley, E., filed Jun. 22, 2017.
Examiner Requisition for Canadian Patent Application No. 2,955,452, dated Oct. 7, 2019.
Advisory Action dated Sep. 27, 2019, for U.S. Appl. No. 15/476,740, of Ho, V., et al., filed Mar. 31, 2017.
Non-Final Office Action dated Nov. 15, 2019, for U.S. Appl. No. 15/390,119, of Ho, V., et al., filed Dec. 23, 2016.
Non-Final Office Action dated Dec. 2, 2019, for U.S. Appl. No. 15/454,892, of Ng, C., et al., filed Mar. 9, 2017.
Final Office Action dated Oct. 17, 2019, for U.S. Appl. No. 14/754,909, of Tsou, V., filed Jun. 30, 2015.
Advisory Action dated Dec. 19, 2019, for U.S. Appl. No. 14/754,909, of Tsou, V., filed Jun. 30, 2015.
Notice of Acceptance for Australian Patent Application No. 2018201228 dated Feb. 21, 2020.
Non-Final Office Action dated Mar. 23, 2020, for U.S. Appl. No. 15/476,740, of Ho, V., et al., filed Mar. 31, 2017.
Final Office Action dated Jun. 1, 2020, for U.S. Appl. No. 15/390,119, of Ho, V., et al., filed Dec. 23, 2016.
Notice of Allowance dated Jun. 10, 2020, for U.S. Appl. No. 15/454,892, of Ng, C., et al., filed Mar. 9, 2017.
Advisory Action dated Aug. 10, 2020, for U.S. Appl. No. 15/390,119, of Ho, V., et al., filed Dec. 23, 2016.
Notice of Grant for Australian Patent Application No. 2018201228 dated Jun. 18, 2020.
Final Office Action dated Oct. 28, 2020, for U.S. Appl. No. 15/476,740, of Ho, V., et al., filed Mar. 31, 2017.

* cited by examiner

1200

| STAFF PERFORMANCE (PAST MONTH) | | | | |
|---|---|---|---|---|
| NAME | HOURS | TABLES | REVENUE | REQUESTS |
| WORKER A | 160 | 28 | $3,000 | 3 |
| WORKER B | 200 | 27 | $3,850 | 5 |
| WORKER C | 80 | 12 | $1,200 | 0 |
| WORKER D | 120 | 18 | $2,500 | 9 |
| . . . | | | | |

FIG. 12

REMOTE ASSOCIATION OF PERMISSIONS FOR PERFORMING AN ACTION

BACKGROUND

Workers in a restaurant are commonly the primary representatives of the restaurant interacting with customers. For example, workers can provide information about menus, take orders, deliver items, solicit and receive customer feedback about customers' dining experiences, and/or facilitate payment of tickets.

Many merchants require workers to obtain approval from a manager or other worker before performing certain actions. This practice ensures that merchants can limit actions requiring an exercise of discretion to certain personnel. Actions that require discretion—and thus require manager approval—are often those actions that affect the merchant's bottom line or could create liability for the merchant if performed or not performed. For example, in the restaurant context, manager approval is often required to remove a charge from a customer's ticket (for example, a comp or void). In another (non-limiting) example, manager approval could be required for a worker to submit a tip to a payment processing service that is unusually high (e.g., larger than the customary 15-20%).

Conventionally, a manager has needed to be physically present on the restaurant premises to approve such actions. For instance, the manager may be required to manually enter a manager PIN or authorization code on a device within the restaurant to authorize a particular action. Similar difficulties exist for other types of merchants that require managerial authorization for employee actions.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 12 illustrates an example UI that provides information regarding workers' performance, as described herein.

DETAILED DESCRIPTION

Figure 1:
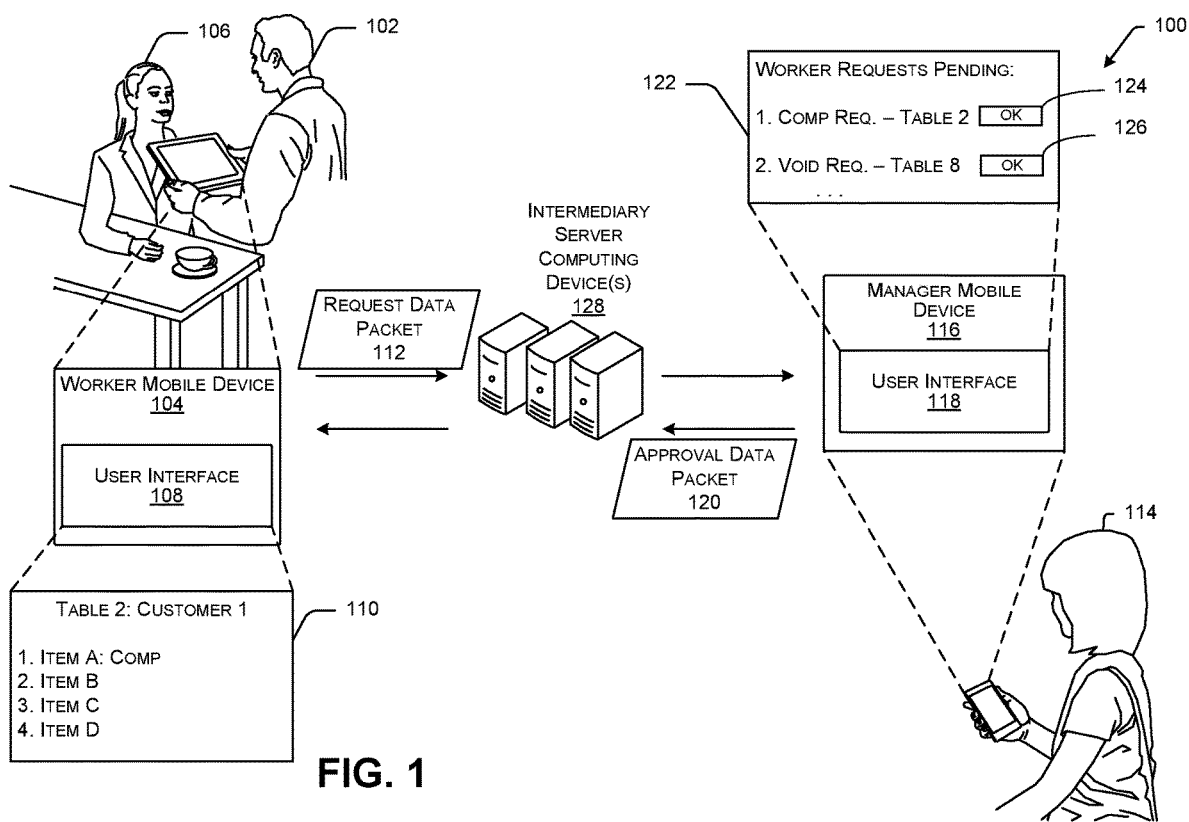
FIG. 1 illustrates an example environment for requesting and/or provisioning manager approvals, as described herein.

Techniques described herein are directed to remote provisioning of manager approval to enable completion of actions pertaining to transactions. For instance, a worker can send a request for approval to perform an action for which the worker has restricted or insufficient permissions. Using techniques described herein, a worker, via a mobile device executing application(s) that restrict the worker's ability to perform the action, can submit a request that a manager approve the action, and the manager can approve the action via a remote device. In an example, the action the worker wishes to perform is an action within a point-of-sale (POS) application that the worker has insufficient permissions in the POS application to perform (e.g., a void, a comp, etc.). Manager approval enables the worker to perform the action by causing an update of the worker's permissions. For instance, a worker can desire to void an item in an order but may not have permissions to do so. Techniques described herein can facilitate remote provisioning of approval from a manager of the worker thereby enabling the worker to void the item without the manager needing to be present or otherwise effectuating the void (e.g., other than by remotely provisioning approval).

Additionally, techniques described herein are directed to sending a notification of the request to a mobile device of the manager and enabling the manager to indicate approval of the request via input to a UI displayed on the mobile device. For instance, a manager can receive a pop-up notification of a request on their mobile phone, and can approve or deny the request by selecting a control that can be displayed as part of the notification. In some examples, depending on the type of request, a request from a worker can be automatically handled without manager review. That is, in some examples, techniques described herein are directed to applying a set of rules to determine whether a request requires manager review and/or approval and determining whether (i) an action can be performed without manager review and/or approval (e.g., automatically) or (ii) the action requires manager review and/or approval. As a non-limiting example, a rule can indicate that manager review and/or approval of an action is not required if such action would result in a loss to the merchant of less than $5.00.

Techniques described herein are additionally directed to aggregating data and generating analytics that can be surfaced to a manager regarding approval and/or denial of requests for approval. In some examples, the analytics can provide insight into the frequency that workers are requesting manager approvals, the relative frequency that managers are approving and/or denying requests, types of items and/or actions that are commonly subjects of requests for manager approval, etc. Moreover, in some examples, transaction data from multiple merchants can be aggregated and included in the analytics so that comparisons between different merchants can be generated in relation to requests for manager approval.

As described above, this disclosure is directed to, at least in part, requesting approval to perform an action for which a worker does not have sufficient permissions to perform. As used herein, a "request for approval" can be a data transmission from a mobile device of a worker to another computing device (e.g., a remote server, a local server, a mobile device of a manager, etc.) that is associated with a request for approval to perform an action that a worker is not permitted to perform. "Request for approval" is used interchangeably with a "request for manager approval." In this disclosure, by approving a request, a manager effectuates an update to permissions of the worker making the request. In other words, the manager can (remotely) update one or more permissions that were preventing the worker from taking the action to which the request pertains. In some examples, the permissions of the worker can be updated on the worker mobile device. In other examples, the permissions of the worker can be updated on another device (e.g., a remote server, a local server, a mobile device of a manager, etc.). In either case, the manager can effectuate an update to the worker's permissions via a remote device.

As described above, many merchants require their employees to physically obtain approval from a manager or other employee before taking certain actions. This practice ensures that merchants can limit actions requiring an exercise of discretion to only certain personnel. Actions that require discretion—and thus require manager approval—are often those actions that affect the merchant's bottom line or could create liability for the merchant if performed or not performed. For example, in the restaurant context, manager approval is often required to remove a charge from a customer's ticket (e.g., a comp or a void). As used herein, a "comp" can be a removal or reduction of a charge from a customer's ticket for an item the customer received, and a "void" can be removal or reduction of a charge from a customer's ticket for an item that the customer did not receive (for example, for an item a worker erroneously indicated was ordered, or for an item that was canceled by a customer after ordering but before receipt of the item). In another (non-limiting) example, manager approval can be required for a worker to submit a tip to a payment processing service that is in excess of 30% of the food and drink charges. Of course, this is merely an example, and the actions subject to manager approval can be customized by each merchant generally, and in this disclosure. In this disclosure, examples of such actions are discussed, but are not intended to be limiting.

Techniques described herein are described as occurring in a restaurant context. However, techniques described herein can also be applied in other contexts and at other types of merchants. That is, techniques described herein are not limited to restaurants, workers, customers, merchants, etc. Further, these can also be applied to other contexts such as peer-to-peer ("P2P") money transfer, lending, invoice settlements, and the like.

Conventionally, merchants have used a system that requires that workers have personal contact with an on-site manager in order for the manager to approve actions such as those described herein. At some merchants, a worker must physically approach a manager, explain the request for approval, receive approval or denial during the exchange, then perform the action (if approved). This need for face-to-face communication creates a lag in the transaction, and a slow-down of a merchant's business generally because a worker must locate and present the request for approval to a manager in person. In some examples, a manager is required to approve the request by entering a manager personal identification number (PIN) or other authorization code into a device in order to update the worker's permission level. Often, a transaction cannot proceed unless and/or until manager authorization is provided, thereby pausing the check-out flow, irritating customers, causing workers to forgo actions they believe are necessary or warranted, and ultimately, because of the delay, reducing the number of customers who can be served.

Techniques described herein can provide a number of benefits and improvements over conventional techniques. For example, enabling requests for manager approval to be made and responded to by worker mobile devices (e.g., mobile devices operable by workers) and manager mobile devices (e.g., mobile devices operable by managers), respectively, obviates the need for the worker-manager face-to-face conversation and/or a manager's entry of authorization codes. The unique configuration of devices and applications implemented in the techniques described provide enhanced efficiency to providing responses to requests for manager approval.

At least by eliminating the need for face-to-face and/or on-site communication, a number of improvements to authorization systems result from the techniques described herein. For instance, a worker need not stop work to locate a manager to make a request; a manager need not be on-site to approve requests; requests can be removed from earshot of customers; a manager can address requests in any order the manager chooses; requests can be ordered according to priority rules; a manager can defer a decision on a request until a decision is necessary (thus avoiding earlier decisions based on incomplete information that could be irreversible); etc. Techniques described allow for asynchronous provisioning of permissions such that a manager can delay provisioning a response to a request. Delaying a response allows a transaction to continue (and/or an order to continue being built) instead of coming to a halt because a response has not been received. By allowing for delayed response from a manager, the manager can access more information about actions taken with respect to a transaction, some that occurred after the request was made (e.g., additional requests for manager approval, additional items ordered, etc.), thereby enabling the manager to make more intelligent decisions (e.g., approval or denial) with regard to requests for approval.

Techniques described herein can also provide improvements over traditional systems because data regarding transactions and requests for approval can be aggregated and analyzed. In an example, techniques described herein enable data collection and analysis with respect to requests, both individual and aggregated, that a manager can use in making decisions about requests. Submitting the request within the context of a POS application enables other data to be associated with the request, such as a customer's identity, the customer's frequency of visits to the merchant, average ticket size of the customer, the times of arrival, seating, ordering, service, etc. Techniques described herein enable interactions at least between a POS application and a manager application in a non-conventional and non-generic arrangement. Moreover, when payment processing service server device(s) process requests, even more information can be provided to the manager (for example, regional statistics on requests for approval at multiple merchants serviced by a payment processing service).

Techniques described herein additionally improve upon conventional techniques at least because requests for approval can be intelligently routed to managers, none of whom need to be on-site, based on who is on shift, who traditionally makes decisions on the type of the request, who is nearby, a hierarchy of managers who can respond, etc. That is, data that is not conventionally available to authorization systems can be leveraged to intelligently route requests to managers to maximize the efficiency with which managers are able to review and/or approve requests for approval.

Moreover, in some examples, the techniques described herein enable analysis of the context and details of a request for approval in near-real-time. Additional information about a request can be provided to the manager mobile device by local server device(s) and/or payment processing service server device(s) in conjunction with the request, and the additional information can be relied on by a manager in deciding whether to approve the request. In a non-limiting example, a manager can learn that a customer requesting a comp has made a dozen comp requests in the past year. The manager can then make an informed decision to reject the request.

These techniques can also be implemented in other scenarios, such as between two P2P users, where a first user can get provisional authorization from a second user to send a specific amount of money to a third user on the second user's behalf (or authorization of a specific time to send the money). In a lending scenario, these techniques dynamically render access to an entity to be able to lend the original funds from a first entity to a second entity, wherein the access includes the transfer of contract obligations from the first to the second entity for a specific period, amount, or purpose.

At least for the reasons given above, techniques described herein, and systems described as implementing techniques described herein, are unconventional, non-routine, non-generic, and yield improvements to relevant technologies.

In various examples of the techniques described herein, the approval of the request can be remote, automatic, and/or provisional. In addition, in some examples, the approval can be granted in the form of change of access control or even a code, both of which can be associated with restrictions, such as those related to time for which the code is valid, actions to which the code or permission can be applied, etc. In an example, the code can be associated with a specific action, but not all actions that a manager can perform. The code can be a alphanumeric character (or a string of alphanumeric characters), such as a number (i.e., numeric), a letter (i.e., alphabetic), or a combination thereof. The code can be tied to a specific employee or employee account to maintain accountability and track usage of code on other devices or actions. In an example, employee initials can be associated with a request and/or approval to allow tracking of the employees associated with the interaction.

For the purpose of this discussion, a "merchant" can be any entity that offers items (e.g., goods or services) for acquisition (e.g., sale, lease, free, etc.). Non-limiting examples of merchants include restaurants, retail stores, spas, salons, museums, amusement parks, etc. Additionally, for the purpose of this discussion a merchant can be associated with employees or other agents that perform services for the merchant. For the purpose of this discussion, a "worker" can include any employee or agent of a merchant. "Worker mobile device" is used herein to describe a mobile device operable by a worker and used, at least partially, for work purposes. For the purpose of this discussion, a "manager" can refer to a person associated with a merchant—who may also qualify as a "worker"— but who has the capability of issuing manager approvals and/or who has a permission level sufficient to update a permission of another worker. For example, a "manager" can include a supervisor, an owner, a person with more seniority than the worker, or a "second set of eyes." A "manager mobile device" is used herein to describe a mobile device operable by a manager and used, at least partially, for work purposes.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes, or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

FIG. 1 illustrates an example environment 100 for requesting and/or provisioning manager approvals, as described herein. Environment 100 includes a worker 102 associated with a merchant. In environment 100 as illustrated, the merchant is a restaurant and worker 102 is a waitperson at the restaurant, but in other examples, the merchant can be another type of merchant, such as a spa, car dealership, etc. Worker 102 can operate a worker mobile device 104. Customer 106 is shown interacting with worker 102, who is waiting on a table at which customer 106 sits. A single customer 106 is shown for ease of illustration; however, example 100 can include additional customers. Worker mobile device 104 can be associated with at least a UI 108. Environment 100 also includes a manager 114, who is associated with the merchant and who is a manager of worker 102. That is, manager 114 has at least some permissions higher than those of worker 102. Manager 114 is shown interacting with a manager mobile device 116. Manager mobile device 116 can be associated with at least UI 118 for receiving, interacting with, and/or approving requests for manager approval.

In an example, customer 106 can ask worker 102 to remove an item from a ticket that includes items that customer 106 has ordered. For example, customer 106 may indicate that she is dissatisfied with the quality of an item and does not want to pay for the item. In response, in an example, worker 102 can enter input to an order summary 110 presented by UI 108 to comp customer 106 for the amount of the item, which would remove or reduce the charge for the item from the total cost of the ticket of customer 106. Worker mobile device 104 determines that worker 102 lacks a minimum permission level to perform the action (e.g., comp the item). In response to determining worker 102 lacks permission to proceed with the comp, worker mobile device 104 can send a request data packet 112 comprising at least a request for a manager to approve a comp for the item. In an example, approval comprises at least updating a permission level of worker 102 so that worker 102 can perform the action (e.g., comp the item). Additional details associated with permission(s) and/or approval(s) are described below with reference to FIGS. 2-17.

Worker mobile device 104 and manager mobile device 116 can communicate directly with each other. Additionally or alternatively, worker mobile device 104 and manager mobile device 116 can communicate with an intermediary server computing device(s) 128 that can communicate with both worker mobile device 104 and manager mobile device 116. As described below with reference to FIGS. 2-4, intermediary server computing devices(s) 128 can comprise local server device(s), payment processing service server device(s), or a combination of local server device(s) and payment processing service server device(s).

In some examples, a request data packet (e.g., request data packet 112) can include additional information. For example, worker 102 can enter additional information to order summary 110 regarding the context of the comp, such as a reason customer 106 would like the comp or comments by worker 102 about the merits of a complaint of customer 106. In other examples, data can be associated with request data packet 112 by an application executing on worker mobile device 104 (for example, a POS application) rather than being manually entered by worker 102. In such examples, the data can include a table that customer 106 is sitting at, a time customer 106 was seated at the table, a time customer 106 asked for the comp, whether customer 106 is a new customer or a returning customer, a price and identity of an item that is the subject of the comp, an identifier of a ticket associated with the transaction to which comp pertains, etc.

In the example illustrated in FIG. 1, manager mobile device 116 receives request data packet 112 (directly or via intermediary server computing device(s) 128). In some examples, request data packet 112 can be in the form of a text message, an email, a push notification, a sound, a notification associated with a dashboard, etc. In some examples, request data packet 112 can be received by a manager application on manager mobile device 116. In at least one example, a manager application executable by the manager mobile device 116 can present a UI 118 on manager mobile device 116 that enables manager 114 to review requests for manager approval submitted by workers such as worker 102.

Throughout this disclosure, reference is made to presenting a UI. It should be noted that in some examples, an application (e.g., POS application, manager application) can generate instructions for presenting a UI and can execute such instructions for presenting the UI. Alternatively, in some examples, a first application can generate the instructions and send the instructions to a second application. In such examples, the second application can execute the received instructions for presenting the UI. In some examples, the first application and the second application can be executing on same computing devices or different computing devices.

In FIG. 1, UI 118 is illustrated as displaying pending worker requests 122 (shown in a numbered queue as 1 and 2). Selectable control 124 ("OK") can be operable to cause the manager application to approve the request to which selectable control 124 is adjacent (e.g., Comp Req. —Table 2). Selectable control 126 ("OK") can be operable to cause the manager application to approve the request to which selectable control 126 is adjacent (e.g., Void Req. —Table 8). For purposes of FIG. 1, selectable control 124 corresponds to request data packet 112.

Selection of selectable control 124 causes the manager application to update a permission level associated with worker 102 for the action (e.g., comp) so that worker 102 can proceed with the action. In some examples, manager mobile device 116 can send an approval data packet 120 that is received by worker mobile device 104. In some examples, approval data packet 120 comprises an indication that the request for manager approval has been approved. In some examples, the POS application executing on worker mobile device 104 can cause an indication to be displayed on a UI of worker mobile device 104. In some examples, the indication indicates that manager approval has been provisioned and/or indicates that a permission level of worker 102 has been updated.

It should be noted that UI 122 is but a single example configuration of a UI and any configuration can be imagined. Similarly, selectable controls 124, 126 are non-limiting examples of selectable controls. Any UI element can be presented to enable actuation of a mechanism for responding to a request for manager approval.

In some examples, responsive to the update of the permission level of worker 102, worker 102 can proceed with the action to which the request for manager approval pertains by manual input to the worker mobile device 104. For instance, worker 102 can again interact with order summary 110 displayed on the worker mobile device 104 to comp customer 106 for the amount of the item, which worker mobile device 104 can process as approved. Now that worker 102 has the permissions to comp customer 106, worker mobile device 104 can effectuate the comp. Additionally or alternatively, worker mobile device 104 can automatically perform the action on the worker's behalf. That is, worker mobile device 104 can apply the comp without further action on the part of worker 102.

Figure 2:
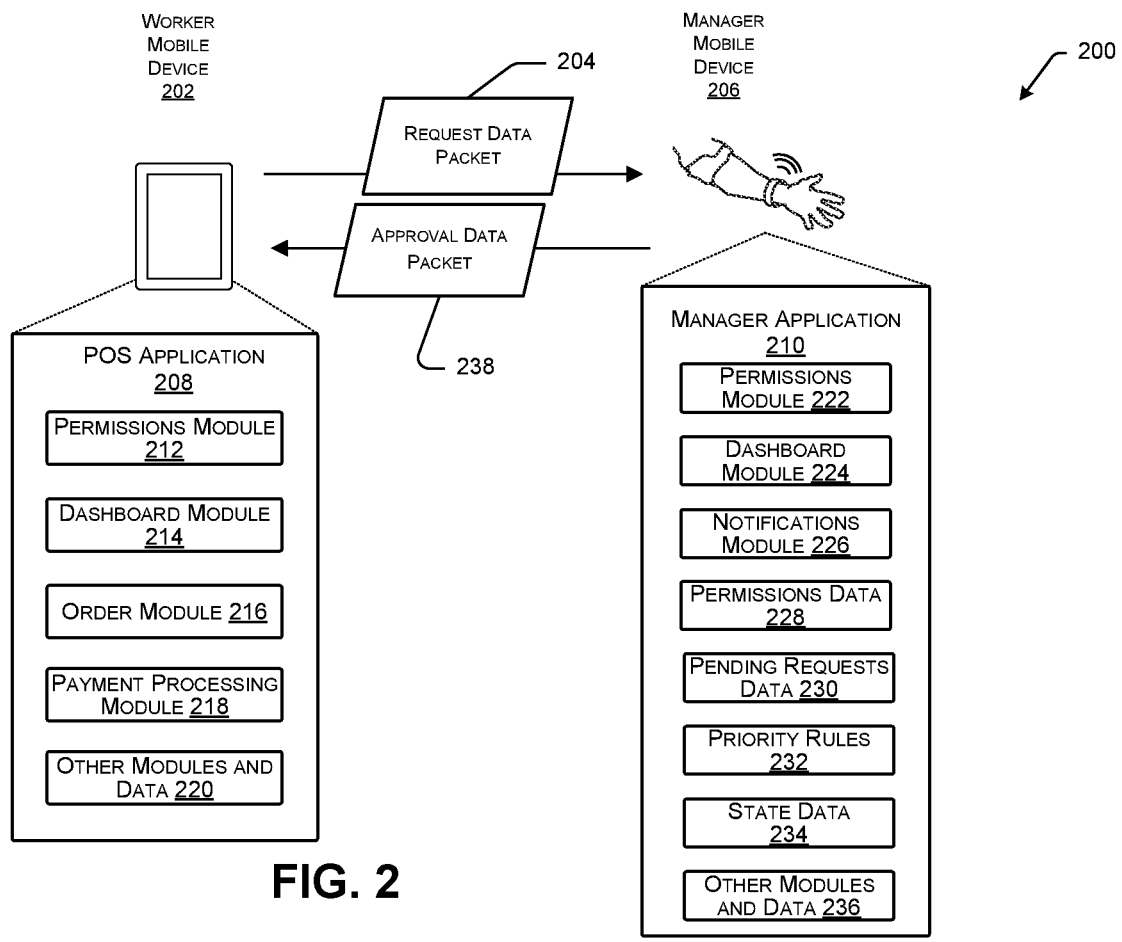
FIG. 2 illustrates a first example system for requesting and/or provisioning manager approvals, as described herein.

FIG. 2 illustrates a first example system 200 for requesting, provisioning, and/or controlling access for performing an action, as described herein. The access can be tied to a permission level that can be higher or lower than the permission level currently associated with an entity seeking to perform the action. System 200 can perform a process similar to the process described above in FIG. 1. For instance, in an example, a device associated with a first user (e.g., a worker mobile device 202) can send a request data packet (e.g., request data packet 204) comprising a request for manager approval to another device associated with a second user (e.g., a manager mobile device 206), without any intervening processing of request data packet 204 by a server device (e.g., a local server device, a remote server device, etc.). Although FIG. 2 describes one worker mobile device 202 and one manager mobile device 206, any number of worker mobile devices and manager mobile devices can be used. In some examples, manager mobile device 206 can be proximately located to worker mobile device 202 (e.g., in a same physical location of a merchant). In other examples, manager mobile device 206 can be located remotely from worker mobile device 202.

In FIG. 2, worker mobile device 202 has an application executing thereon that causes request data packet 204 to be sent to a manager application 210 executing on manager mobile device 206. In at least one example, worker application is a POS application 208. In some examples, manager application 210 can be a stand-alone application. In other examples, manager application 210 can be included in a POS application (not shown) stored on manager mobile device 206, wherein the POS application can have similar structure and/or function as POS application 208. In FIG. 2, worker mobile device 202 is illustrated as a tablet and manager mobile device 206 is illustrated as a wearable device. However, as noted above, any computing device, configured with functional components as described herein, can be used for performing techniques described herein. Some examples of worker mobile device 202 and/or manager mobile device 206 can include tablet computing devices; smart phones and mobile communication devices; laptops, netbooks and other portable computers or semi-portable computers; wearable computing devices, or other body-mounted computing devices; other computing devices capable of sending communications and performing the functions according to the techniques described herein; or devices described in later paragraphs.

Manager application 210 can be an instance of POS application 208 or a stand-alone application. POS application 208 can configure worker mobile device 202 as a POS terminal, which enables a worker to perform transactions with one or more customers and submit the transactions (transaction data associated therewith) to a payment processing service that processes payments on behalf of the merchant (e.g., via transmission of transaction data). For the purpose of this discussion, such transactions can be referred to as "POS transactions" and/or "transactions." In at least one example, the payment processing service can provide additional services, such as, but not limited to payroll services, inventory management services, employee management services, money transfer services, financing services, lending services, and appointment services. One or more computing devices can perform one or more actions on behalf of the payment processing service. For example, these techniques can also be implemented in other scenarios, such as between two P2P users, where a first user can get provisional authorization from a second user to send a specific amount of money to a third user on the second user's behalf (or authorization of a specific time to send the money). In a lending scenario, system 200 or a similar system can dynamically render access to an entity to be able to lend the original funds from a first entity to a second entity, where the access includes the transfer of contract obligations from the first to the second entity for a specific period, amount, or purpose.

In at least one example, POS application 208 can determine transaction data associated with POS transactions. Transaction data can include payment data, which can be obtained from a reader device associated with worker mobile device 202, user authentication data, purchase amount information, point-of-purchase information (e.g., item(s) purchased, date of purchase, time of purchase, etc.), etc. POS application 208 can send the transaction data to one or more server devices of a payment processing service and/or directly to manager mobile device 206. Furthermore, POS application 208 can present a UI to enable a worker to interact with POS application 208 and/or the payment processing service via POS application 208. A worker can interact with POS application 208 to perform a plurality of tasks, including, but not limited to, entering orders, modifying orders, closing orders, and/or requesting manager approval for an action that requires the worker to have a permission level that the worker currently does not have.

POS application 208 can include one or more modules, including, but not limited to, a permissions module 212, a dashboard module 214, an order module 216, a payment processing module 218, and other modules, and data 220.

Payment processing module 218 of POS application 208 can be configured to enable worker mobile device 202 to accept payments through various types of payment instruments, for example, payment cards and/or electronic payment, at the POS location from the one or more customers or via an online transaction. Payment processing module 218 can also be communicatively coupled to a payment reader, such as a mobile payment reader (not shown). Payment processing module 218 can communicate transaction data to a payment processing service. In at least one example, payment processing module 218 can present various UIs to enable a worker to conduct transactions, receive payments, and so forth.

Dashboard module 214 of POS application can present a dashboard UI that provides an at-a-glance view of key information (e.g., associated with requests for approval, transactions, payments, etc.). In at least one example, dashboard module 214 can surface information about requests for manager approval (e.g., status of requests, approval/denial of requests, authorized and nonauthorized actions, etc.). In at least one example, the dashboard UI can be presented via a web browser. In other examples, a mobile application other than POS application 208 can cause the dashboard UI to be presented. The other application can be provided by the payment processing service, or can be an otherwise dedicated application.

Worker mobile device 202 can additionally include an order module 216. Order module 216 can be configured to allow the worker to generate data structures, for specific purposes, such as: collecting orders (e.g., add items to a ticket), thereby building tickets for customers; making appointments (e.g., modifying current and future appointments); settling invoices; etc. The order module 216 can additionally communicate the orders via local server device(s) to other employees of the merchant (e.g., to a kitchen display system or other system connectively coupled to worker mobile device 202 and/or local server device(s)). Order module 216 can present an order UI on worker mobile device 202 that displays a menu in text or images. The text and/or images can be selectable to cause the order UI to indicate that an item has been ordered (e.g., added to a ticket). The order UI can also group items ordered by a customer who ordered them, for instance, in a ticket. A ticket can be a data structure representative of an order of one or more customers. The data structure can be associated with information including, but not limited to, items ordered by the one or more customers, time of events occurring during the current visit of the one or more customers (e.g., arrival time, a time when an order was submitted to the kitchen, etc.), identities of the one or more customers, worker notes (e.g., regarding special requests, feedback to merchant, etc.), split information regarding how to split the ticket, etc.

Worker mobile device 202 can also include a permissions module 212 that can be configured to analyze a request to perform an action associated with a transaction between a merchant and a customer. In some examples, the worker operating worker mobile device 202 can indicate a desire to perform an action via POS application 208. Permissions module 212 can determine whether the worker is authorized to perform the action. Permissions module 212 can reference permissions data stored by POS application 208 that can indicate permissions required for individual actions and/or permissions associated with individual workers. In at least one example, permissions module 212 can determine a permission level associated with the worker, based on permissions data 228. The permission level can define the permissions of the worker with respect to an individual action. The worker may have different permission levels for different actions. Permissions module 212 can determine, based on permissions data 228, whether the worker has authority to (1) perform the action without approval and/or without updating a permission, or (2) perform the action only with approval and/or permissions update of another person (e.g., a manager). Additionally, in some examples, permissions module 212 can determine that a worker lacks authority to perform an action, with or without manager approval. Permissions module 212 can additionally or alternatively be configured to access identity data associated with login credentials and/or biometric data input into worker mobile device 202. Permissions module 212 can analyze the identity data to determine an identity of the worker using worker mobile device 202. In an example, permissions module 212 can determine permissions of the worker based at least in part on the identity of the worker.

In some examples, a manager can define permission level(s) of worker when the worker is onboarded. In some examples, the permission level(s) can be input by a manager to manager mobile device 206 via a permissions module 222 of manager application 210. In some examples, permission level(s) can be changed at the discretion of the merchant and/or manager. For example, permission levels of a worker may be changed in response to a worker being assigned a new role at the merchant. In some examples, permission level(s) can be based on one or more determinants such as role, time of day, location, staffing, etc. Permission level(s) can be dynamic and can be automatically changed depending on the determinants. In an example, the permission level(s) can be changed for a worker for late-night hours.

In some examples, input to worker mobile device 202 (via an order UI or other UI, for example), can be associated with a transaction-related action that requires approval of a manager for the worker to perform. For instance, a worker may be seeking to comp an item, void an item, remove taxes from a check (e.g., on behalf of a diplomat who is not obligated to pay U.S. taxes), transfer a ticket to another server, submit an unusually high tip as part of a customer's payment transaction, etc.

Upon receiving an indication that the worker has requested to perform an action, permissions module 212 can determine, using permissions data 228, the permission level of the worker associated with the requested action. Permission levels can be hierarchical. In some examples, a permission level can be based on various worker characteristics. For instance, a permission level can be based on a date of hire, a position, or a job title associated with the merchant. For example, workers can be assigned a first permission level (lower in a hierarchy) for a certain action, and managers can be assigned a second permission level (higher in the hierarchy) for the certain action. In other words, permissions module 212 can compare requests to perform an action with the worker's permission level corresponding to that action. Permission levels may correspond to, or complement, access controls associated with a merchant. A merchant can alter access controls to give workers authority to perform actions in a variety of ways, such as by controlling transfer of data, transfer of device ownership, etc.

In an example, for actions such as those described above (e.g., comp, void, remove taxes, transfer ticket, high tip, etc.), permissions module 212 can determine that the worker does not have the permission level to perform a particular action without approval of a manager and/or that that a manager must update the worker's permission level in order for the worker to perform the action. Based at least in part on determining that the worker lacks a sufficient permission level for an action, permissions module 212 can transmit request data packet 204 comprising the request for manager approval. In an example, request data packet 204 can be submitted by POS application 208 via selection of a selectable control of a UI of POS application 208 (e.g., by the worker), or can be submitted automatically by permissions module 212 upon a determination by permissions module 212 that an action is not authorized. In some examples, request data packet 204 can be transmitted directly to manager mobile device 206. In other examples, request data packet 204 can be relayed to manager mobile device 206 through another device. Examples of configurations that include an intermediate device between worker mobile device 202 and manager mobile device 206 are described below in the discussion of FIGS. 3 and 4.

Alternatively, upon determining that the worker's permission level allows the worker to perform the action without additional approval and/or adjustment of permissions, permissions module 212 can relay an instruction to payment processing module 218 and/or other modules to process the action. In some examples, an order UI, for example, can display an indication that the action has been performed (e.g., in the example where payment processing module 218 of worker mobile device 202 performs the action automatically). Additionally or alternatively, the order UI can present a selectable control, that when selected, sends an instruction to payment processing module 218 and/or other modules to perform the action (e.g., in the example where the worker is required to provide an additional input to effectuate the action).

POS application 208 of worker mobile device 202 can additionally include other modules and data 220 not specifically discussed above, including, but not limited to, a payroll module, an inventory module, and/or an appointment module.

In the example illustrated in FIG. 2, manager application 210 of manager mobile device 206 receives request data packet 204.

Manager application 210 can perform a variety of functions pertaining to management, including, but not limited to, receipt of requests for approval, approval of requests and/or presentation of data associated with requests. Manager application 210 can include modules including, but not limited to, a permissions module 222, a dashboard module 224, and/or a notifications module 226. Manager application 210 can store data including, but not limited to, permissions data 228, pending requests data 230, priority rules 232, and/or state data 234. Manager application 210 of manager mobile device 206 can additionally include other modules and data 236 not specifically discussed above, including, but not limited to, a payroll module, an inventory module, and/or an appointment module. The modules and/or data of manager application 210 can be arranged in a distributed fashion such that one or more may be stored on worker mobile device 202, manager mobile device 206, etc.

Permissions module 222 of manager application 210 can receive request data packet 204 and can determine whether the request for manager approval can be handled automatically, without presenting the request to a manager, or whether the request should be presented to a manager for a decision. In some examples, permissions module 222 can receive request data packet 204. In response to receiving request data packet 204, permissions module 222 analyzes request data packet 204. In some examples, upon determining that the request corresponding to request data packet 204 can be handled automatically without manager review, permissions module 222 approves the request and manager application 210 automatically transmits the approval to POS application 208. Alternatively, upon determining that the request requires manager review, permissions module 222 stores request data packet 204 in pending requests data 230.

In some examples in which permissions module 222 determines that the request can be handled automatically, permissions module 222 can be configured to determine whether to approve, deny, or conditionally approve the request. Permissions module 222 can analyze characteristics of the request with regard to a set of rules. A non-limiting example of a rule might require that a request be automatically denied when the request would require more than a $150 write-off for the merchant. As another non-limiting example, a rule might indicate that a request is to be conditionally approved if the request would involve a write-off between $50 and $100, until the final ticket includes charges to the customer of more than $300. In such an example, a request for a $50-$100 comp can be approved based on determining that the final ticket includes charges to the customer that exceed $300. In some examples, the rules can be learned by a machine learning mechanism. In such examples, permissions module 222 can be configured to automatically approve pending requests based on approval or denial of historical requests (and trends observed therefrom). The rules can also be customized based on the manager-worker relationship, manager history with approvals at this or other merchant locations, worker history at this or other merchant locations, time of the day, location of the merchant, transaction amount, urgency of the request, identity of the requestor (e.g., the customer named on the ticket), etc.

In at least one example, manager application 210 can train and store data model(s), for instance in the other modules and data 236. In at least one example, the data model(s) can be trained utilizing machine learning mechanisms in which input data relates to historical requests for manager approval. The input data can include descriptive data indicative of characteristics of the historical requests and indications of whether such requests were approved (or denied). The data model(s) can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. For a particular pending request, a trained data model can output a similarity score indicative of whether the particular request is similar to requests that were approved (as opposed to denied). If the similarity score meets or exceeds a threshold similarity score (e.g., showing that the particular request is more similar to approved requests), permissions module 222 can automatically approve the particular request. If the similarity score is below the threshold similarity score, the request is sent to the manager for review. The machine learning mechanism can learn the similarity metric and the threshold similarity score. In at least one example, the data model(s) can comprise one or more rules in the set of rules described above. Automatic handling of requests increases the rate at which requests can be reviewed and/or approved Alternatively, in some examples, permissions module 222 can determine that the request corresponding to request data packet 204 can be approved by a combination of approvals from non-managers, in lieu of approval by a manager. For example, the worker can perform the action when two other employees agree that the worker can proceed with the action. In an example, based at least in part on determining that the action can be approved by a combination of approvals, permissions module 222 can transmit the request to devices of the two other employees (not shown). Upon receiving approval from both devices of the two other employees, permissions module 222 approves the request and manager application 210 automatically transmits the approval to POS application 208.

In some examples, permissions module 222 can cause manager application 210 to temporarily store data associated with the request as part of pending requests data 230. Pending requests data 230 can include data associated with pending requests from a plurality of workers. Priority rules 232 can be applied to pending requests data 230. Priority rules can be applied to determine a priority level for a request based on characteristics of the request (and/or an associated order, transaction, ticket, etc.). As used herein, an "order" can be a request for provision of goods or services by one or more customers to a merchant and a "ticket" can be a data record associated with an "order." The ticket can be kept "open" for a period of time to track orders made during that time. Permissions module 222 can form a request queue in this way, wherein permissions module 222 can place requests for manager approval, such as the request corresponding to request data packet 204, in an order from highest to lowest priority. For instance, in one example, applying priority rules 232, permissions module 222 places requests for voids first in the queue and places requests for ticket transfer lowest in the queue. In other non-limiting examples, permissions module 222 can apply priority rules 232 to order requests according to how long a ticket has been open, a time manager application 210 received a request, a manual priority level set by the worker submitting the request, a dollar value at issue, a total spend of the transaction, an estimated time before a ticket will be closed, gravity of harm at issue with the request (e.g., as based on a risk analysis using transaction characteristics, ticket characteristics, or request characteristics), etc. Thus, permissions module 222 can establish the order of requests in the request queue by applying priority rules 232.

Additionally, permissions module 222 can alter the order of requests in the request queue in response to events occurring in the transactions to which the requests relate. Permissions module 222 can monitor transactions via state data 234 received from POS application 208. State data 234 can be stored on manager mobile device 206. Upon permissions module 222 determining that the state of a transaction satisfies a trigger condition, the corresponding request can be prioritized over other pending requests (e.g., moved to the top of the queue). Trigger conditions can include, but are not limited to, a dollar amount of a ticket, a customer requesting their check, a customer having been served dessert, a customer who is complaining about service or food, a length of time a ticket has been open, a request for approval via an escalation mechanism, etc.

An additional or alternative function of permissions module 222 can be to analyze data regarding workers' requests to ensure workers are not misusing the requests and/or the permissions. In some examples, permissions module 222 can analyze a number of requests from a worker, based at least in part on a time of day a worker is submitting requests, an amount of time between approval by a manager and action by a worker, etc. Such information can be surfaced via a UI associated with manager application 210, as described below. The manager can review the data and accordingly, flag such employees for future requests.

Permissions module 222 can apply priority rules 232 to pending requests data 230 periodically (e.g., upon receipt of a new request data packet). Additionally or alternatively, the permissions module 222 can apply priority rules 232 at a particular frequency, after a lapse of a predetermined period of time, etc.

Moreover, permissions module 222 can determine a state of the transaction corresponding to the request associated with request data packet 204 based at least in part on near-real-time data received from POS application 208 of worker mobile device 202, wherein the near-real-time data indicates characteristics of transactions. For example, a state can be that a ticket is open but no customers have ordered food yet. Alternatively, a state can be that customers have ordered but no items have been delivered to the table. As another alternative, a state can be that customers have been served coffee and dessert. In other examples, a state of a transaction can be at least one of an identity of a customer associated with a ticket, a time a customer was seated at a table, a total time that a ticket has been open, a number of customers in a group of customers associated with a ticket, etc.

In an example, permissions module 222 reviews pending requests data 230 and state data 234 to determine whether transactions for any pending requests have changed to a state that satisfies a trigger condition stored by manager application 210. For example, permissions module 222 can determine that a request has been open for more than two hours by examining state data 234. Permissions module 222 can determine that the state of being open for more than two hours satisfies a trigger condition. In another example, permissions module 222 can analyze state data 234 and determine that a state of a transaction is that a customer has received dessert. Permissions module 222 can determine that a customer receiving dessert satisfies a trigger condition and can therefore move the request to the top of the request queue or otherwise alert the manager, via a custom visual, audio, or haptic notification, to the pending request. Permissions module 222 can apply priority rules 232 to resolve conflicts between requests, such as those described above, when necessary.

The request queue, as established by applying priority rules 232 and comparing state data 234 to trigger conditions, can be presented via a UI of manager mobile device 206. Permissions module 222 can periodically update the request queue based at least in part on the arrival of new requests and on changing states of transactions. Updates to the request queue in pending requests data 230 can cause, substantially simultaneously, an update to the request queue displayed as part of a UI presented in association with manager application 210.

Notifications module 226 of manager application 210 can cause a notification to be output via manager mobile device 206 and can receive and transmit other notifications. In an example, when manager mobile device 206 receives a request data packet such as request data packet 204, notifications module 226 of manager application 210 can present a notification on manager mobile device 206, to alert the manager of the request. In some examples, the notification can be a pop-up message notification displayed via a UI associated with manager application 210, which can optionally be accompanied by an audible and/or vibrating alert. In an example, the notification can provide notice that a request has been received and, in some examples, can provide a selectable control or other input mechanism to approve the request. In some examples, the notification can include details on the action and/or other information.

When the selectable control is selected and/or another input is provided via the input mechanism, (1) permissions module 222 can modify the worker's permission level stored in the manager application 210 of the manager mobile device 206, and (2) notifications module 226 can send an indication of the approval, via an approval data packet 238, to POS application 208 executing on the worker mobile device 202. In some examples, permissions module 222 can send an instruction for permissions module 212 of POS application 208 to modify the permission level of the worker for the action on the worker mobile device 202. In an example, the instruction can be included with approval data packet 238.

In other examples, a second selectable control, or other input mechanism, can be selected to indicate a denial of the request corresponding to request data packet 204. In these examples, notifications module 226 can send an indication to POS application 208. The indication can indicate that the request has been denied. When the second selectable control is selected and/or input is provided via the other input mechanism, (1) manager application 210 can remove the request from the queue, and/or (2) notifications module 226 can provide a prompt for a manager to enter notes regarding why the request was denied.

Alternatively or additionally to a pop-up message notification (or other notification to alert a manager's attention to a request), dashboard module 224 of manager application 210 can present a dashboard related to the request via a display of the manager mobile device 206. The dashboard can include, but is not limited to, components of the pop-up message notification described above (e.g., an indication that a request has been received, an indication of what the request is for, and one or more selectable icons to approve or deny the request). The dashboard can alternatively or additionally include other information that pertains to requests for manager approval, including, but not limited to, an indication of pending requests, and/or statistics on historical requests (for example, a type of request, a requestor), etc. The dashboard can include, but is not limited to, information such as:

- all or part of a request queue (including indicators that reflect requests that require attention right away);
- approval statistics of the particular manager associated with manager mobile device 206 (for example, how many manager approvals the manager provisioned in comparison to how many requests for manager approval the manager received, in the aggregate or broken down by category of request (e.g., void, comp, etc.));
- total requests received by the particular manager (or by all managers associated with a merchant) in a time period;
- information specific to a type of request (e.g., for comp requests at a restaurant, the dashboard could list the restaurant's most comped items in a time period;
- a percentage of all requests submitted by each worker over a time period; and/or
- information pertaining to requests for manager approval at other merchants (for example, average monthly comps of a restaurant as compared to the average monthly comps for a plurality of restaurants in a metro region, the most comped items in the metro region, etc.).

Information displayed via the dashboard UI can be customized by the manager, the merchant, and/or the payment service. The amount of information displayed on the dashboard UI can vary at least depending on the on the size of the display of the manager mobile device. The information described above can be presented via an additional or alternative UI. In some examples, a notification to alert a manager's attention to a request can be presented within the dashboard UI or via a different UI.

Other information can be available via manager application 210 that can be included in, or provided in addition to, the information described above. Such other information can be accessed via the dashboard.

In the example illustrated in FIG. 2, responsive to receiving manager approval, manager application 210 can send approval data packet 238 to worker mobile device 202. Approval data packet 238 can indicate that manager approval has been provisioned. In some examples, approval data packet 238 can include an instruction to cause permissions module 212 of worker mobile device 202 to generate and/or store updated permissions for the action. The updated permissions can be temporary (e.g., expiring after the action is performed, after the worker's shift, etc.) or permanent. That is, manager approval may be valid for a certain time, for a certain action, or may be otherwise restricted. In some examples, responsive to receiving manager approval, permissions module 222 can generate and/or store updated permissions for the worker to perform the action.

In an example, manager application 210 can send approval data packet 238 in response to selection of a selectable control of a UI of manager application 210 (or another input provided via another input mechanism). When selected, the selectable control causes manager application 210 to transmit approval data packet 238 to worker mobile device 202. In some examples, manager application 210 can transmit approval data packet 238 directly to worker mobile device 202 from manager mobile device 206. In other examples, approval data packet 238 can be relayed to worker mobile device 202 from manager mobile device 206 through an intermediate device. Examples of configurations that include an intermediate device are described below in the discussion of FIGS. 3 and 4. In response to receiving approval data packet 238, POS application 208 of worker mobile device 202 can perform the action for which manager approval was provided. In some examples, based on performance of the action or as part of performance of the action, payment processing module 218 can process the transaction associated with the request.

Permissions module 212 of worker mobile device 202 can present a notification to the worker (e.g., via a UI associated with permissions module 212) that a manager approved the request and/or the action was performed. Additionally or alternatively, a ticket to which the approval pertains can be updated to reflect the approval. In some examples, receipt by worker mobile device 202 of approval data packet 238 can cause events to occur, which can include, but are not limited to:

- removal of an item from a ticket (rather than showing no charge or reduced charge for the item);
- submission of payment information of the customer to a payment processing service for processing of charges associated with a ticket, wherein the ticket reflects the action approved by a manager (for example, comp, void, high tip, removal of taxes, etc.);
- updating a ticket to which the manager approval applies;
- sending a notification to one or more other managers;
- transmission of a message to a customer with an apology and/or promotion for a next visit; and/or
- reassignment of a table's ticket to a different worker.

In an example, worker mobile device 202 can receive an indication that the request corresponding to request data packet 204 was denied. Without approval of the request for manager approval, the worker may not be able to perform the desired action. That is, the worker may not be able to perform the comp, void, or other desired action.

In another example, worker mobile device 202 can receive an indication that there was no response to the request within a threshold period of time. In response, in examples in which request data packet 204 was directed to a particular manager, worker mobile device 202 can send a request to a different manager, can send a notification to the first manager reminding the manager of the pending request, can treat the request as denied, etc.

Figure 3:
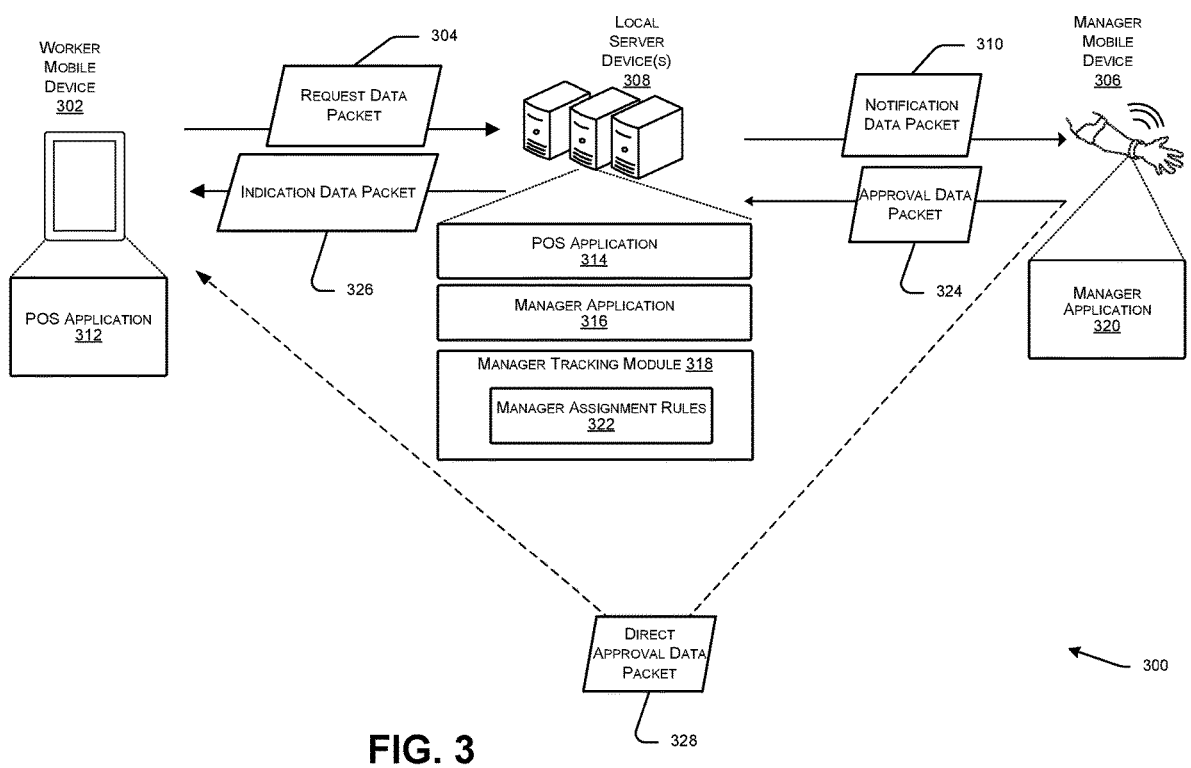
FIG. 3 illustrates a second example system, that includes local server computer(s), for requesting and/or provisioning manager approvals, as described herein.

FIG. 3 illustrates a second example system 300, that includes local server computer(s), for requesting and/or provisioning manager approvals, as described herein. System 300 represents a configuration in which a worker mobile device 302 transmits a data packet comprising a request for manager approval (e.g., request data packet 304) to a manager mobile device 306 via an intermediate device, such as local server device(s) 308. In such a configuration, the local server device(s) 308 can process the request data packet 304 and then send a notification data packet 310 to manager mobile device 306 to notify the manager of the request for manager approval. Although FIG. 3 describes one worker mobile device 302 and one manager mobile device 306, any number of worker mobile devices and manager mobile devices can be used.

FIG. 3 illustrates worker mobile device 302 (which can correspond to worker mobile device 202 of FIG. 2) and POS application 312 (which can correspond to POS application 208 of FIG. 2) executing on worker mobile device 302. POS application 312 can configure worker mobile device 302 as a POS terminal and can, among performing other operations as described above with reference to POS application 208 above, determine transaction data associated with POS transactions.

In the example illustrated in FIG. 3, worker mobile device 302 can send request data packet 304 to local server device(s) 308. In at least one example, local server device(s) 308 can have stored thereon a POS application 314, which can have same or similar structure and/or function as POS application 208, described above with reference to FIG. 2. The modules and/or data of POS application 314 can be arranged in a distributed fashion such that one or more may be stored on worker mobile device 312, local server device(s) 308, manager mobile device 306, etc. In the example illustrated in FIG. 3, local server device(s) 308 can store thereon a manager application 316, which can have same or similar structure and/or function as manager application 210, described above with reference to FIG. 2.

Manager application 316 can include modules including, but not limited to, a permissions module, a dashboard module, and/or notifications module. Manager application can store data including, but not limited to, permissions data, pending requests data, priority rules, and/or state data. Local server device(s) 308 can further include a manager tracking module 318, storing manager assignment rules 322, which can be associated with manager application 316 (or not). The modules and/or data of manager application 316 can be arranged in a distributed fashion such that one or more may be stored on worker mobile device 312, local server device(s) 308, manager mobile device 306, etc.

As described above with respect to FIG. 2, manager application 316 can receive request data packet 304 from worker mobile device 302. Manager application 316 determines whether the worker associated with request data packet 304 is authorized (e.g., has sufficient permissions) to perform the action associated with the request. In an example, manager application 316 can determine that the worker has the required permissions to perform the action and can cause the action to be performed.

In an alternative example (as illustrated in FIG. 3), manager application 316 determines that the worker lacks the authority (e.g., does not have the level of permissions required to perform the action). In the example, manager application 316 proceeds to determine whether local server device(s) 308 needs to submit the request to manager mobile device 306 for manager review, or whether local server device(s) 308 can respond to the request automatically. Manager application 316 can determine whether the state of the transaction to which the requested action satisfies an auto-response criterion. If the state of the transaction satisfies the auto-response criterion, manager application 316 updates the permission level of the worker to be able to perform the requested action. In some examples, manager application 316 can update the permission level temporarily or conditionally. If the state of the transaction does not satisfy the auto-response criterion, the permissions module can send notification data packet 310 to manager application 320 executing on manager mobile device 306.

Manager application 316 can add the request to a queue of pending requests. In some examples, the queue of pending requests can be ordered by application of priority rules. Manager application 316 additionally can monitor state data and move requests higher in the queue upon determining that the state of a transaction to which a request relates meets one or more trigger conditions. Manager application 316 can send changes in the queue to manager application 320 of manager mobile device 306 substantially simultaneously to a change being made at manager application 316.

Manager application 316 can also present a dashboard UI via a display of the local server device(s) 308. In some examples, manager application 316 can present UIs on a display of local server device(s) 308 to display information related to manager approval requests, such as displaying a notification when a new request arrives that can provide can selectable controls to approve or deny the request.

Further, local server device(s) 308 can include a manager tracking module 318. In at least one example, manager tracking module 318 can coordinate communications with and/or among a plurality of managers associated with respective manager mobile devices. In an example, manager tracking module 318 can receive a communication from a manager indicating that the manager will not be at work later that evening. Based at least on this communication, manager application 316 does not send requests for manager approvals to that manager but instead can select another manager to receive those requests. In some examples, manager tracking module 318 can route requests for manager approval based on geolocation data. Manager tracking module 318 can receive geolocation data from a plurality of manager mobile devices. Based at least in part on the geolocation data, manager tracking module 318 can identify which manager would most likely be able to take the absent manager's shift.

Additionally or alternatively, manager tracking module 318 can store employment data, which can include staffing schedules, wages, dates of hire, etc., and determine which manager (and worker) is scheduled to be working at a particular time. Manager tracking module 318 can determine a pool of managers associated with a merchant who are available (for instance, currently working a shift) and eligible (for instance, associated with appropriate permissions) to respond to requests for approval generally or to a particular request for approval. Additionally or alternatively, manager tracking module 318 can refer to manager assignment rules 322 stored in manager tracking module 318 to determine which manager of the pool or plurality of managers to direct a request for manager approval. In some examples, the pool of managers can include managers who work at other merchants (e.g., managers who work at merchants that are commonly-owned as the merchant with which the request for approval is associated). In some examples, managers can be determined based on a hierarchy of managers. For example, all managers are assigned a rank (e.g., by the manager tracking module 318). The highest-ranked manager is identified. If the highest-ranked manager is unavailable or ineligible to respond to a request, the next manager in the hierarchy is identified, etc., until a manager who is available and eligible is identified and consequently selected to receive the request.

Manager application 316 can send notification data packet 310 to manager mobile device 306 in response to local server device(s) 308 receiving a new request data packet (e.g., request data packet 304), re-ordering the quests queue, determining is the request is a request for which manager approval is needed, etc.

Manager application 320, which is stored on manager mobile device 306, can receive notification data packet 310. Manager application 320 can cause a notification associated with notification data packet 310 to be presented on a UI of manager mobile device 306. Similar to the notification described above with respect to FIG. 2, notification data packet 310 can be associated with information about the request, including but not limited to the requestor, the amount at issue, the name of the customer, etc. The notification can additionally include one or more selectable controls that allow a manager to approve or deny a request. A manager may request additional information either via a selectable control displayed with the notification associated with notification data packet 310, or separately within manager application 320. Manager application 320 can send a request to manager application 316 (and/or POS application 314) for information and/or data analysis to satisfy the request for additional information.

In some examples, a manager can select a selectable control associated with the notification that causes manager application 320 to send to manager application 316 an approval data packet 324 comprising an approval of the request associated with request data packet 304. Additionally or alternatively, selection of the selectable control can cause manager application 320 to send instructions to manager application 316 on local server device(s) to generate and/or store updated permissions for the action. The updated permissions can be temporary (e.g., expiring after the action is performed, after the worker's shift, etc.) or permanent. In some examples, selection of the selectable control can cause manager application 320 to generate and store updated permissions for the worker to perform the action.

In some examples, a manager can approve or deny a request, such as the request associated with request data packet 304, via a UI of manager application 316 on local server device(s) 308. In an example, a manager can select a selectable control a UI on local server device(s) 308 to indicate approval or denial of the request.

At least partly in response to receiving approval data packet 324, manager application 316 on local server device(s) 308 can perform different actions. For example, manager application 316 can remove the request from the request queue, send an indication of the approval to worker mobile device 302, etc. In the example illustrated in FIG. 3, in response to local server device(s) 308 receiving approval data packet 324, POS application 314 of local server device(s) 308 can send, to worker mobile device 302, an indication data packet 326 comprising an indication that manager approval has been provisioned. In some examples, POS application 314 can send instructions to POS application 312 that can cause POS application 312 to generate and store updated permissions for the worker to perform the action.

In an example, manager application 316 of local server device(s) 308 can receive an indication from manager mobile device 306 that the request associated with request data packet 304 was denied. Manager application 316 can send an indication of the denial to worker mobile device 302. Without approval of the request, the worker may not be able to perform the desired action. That is, the worker may not be able to perform the comp, void, or other desired action.

In another example, manager application 316 of local server device(s) 308 can determine that a manager did not respond to the request associated with request data packet 304 within a threshold period of time. In response, local server device(s) 308 can send a notification to the manager mobile device 306 reminding the manager of the request, can send another request to a different manager (wherein the different manager can be determined at local server device(s) 308 by manager tracking module 318 according to manager assignment rules 322), can send an indication to worker mobile device 302 that the request is denied, etc.

As illustrated in FIG. 3, in some cases, manager mobile device 306 can communicate directly with worker mobile device 302 to relay manager approval, via a direct approval data packet 328, without including an intermediary such as local server device(s) 308. In such a case, direct approval data packet 328 can cause POS application 312 to generate and store updated permissions for the worker to perform the action. The updated permissions can be temporary or permanent.

Local server device(s) 308 can, in some examples, analyze data collected via POS application 314 and manager application 316 to provide information to the merchant. For example, manager application 316 of local server device(s) 308 can analyze data regarding requests for manager approval, with or without the addition of transaction data from POS application 314, to provide recommendations to merchants. Data regarding requests for manager approval can include type of request, a requestor, manager responding, time of day, amount of ticket, length of visit, date, managers on staff, managers available to respond, subject matter of request, items at issue, etc. Local server device(s) 308 can leverage this data to intelligently generate reports and analysis useful to management regarding staffing, inventory, hours of operation, etc. Manager application 316 can generate a UI including such reports and analysis and send the UI to manager application 320. Manager application 320 can cause the UI to be presented on a display of manager mobile device 306 for manager review. Additionally or alternatively, manager application 316 can cause the UI to be presented on a display of local server device(s) 308.

Figure 4:
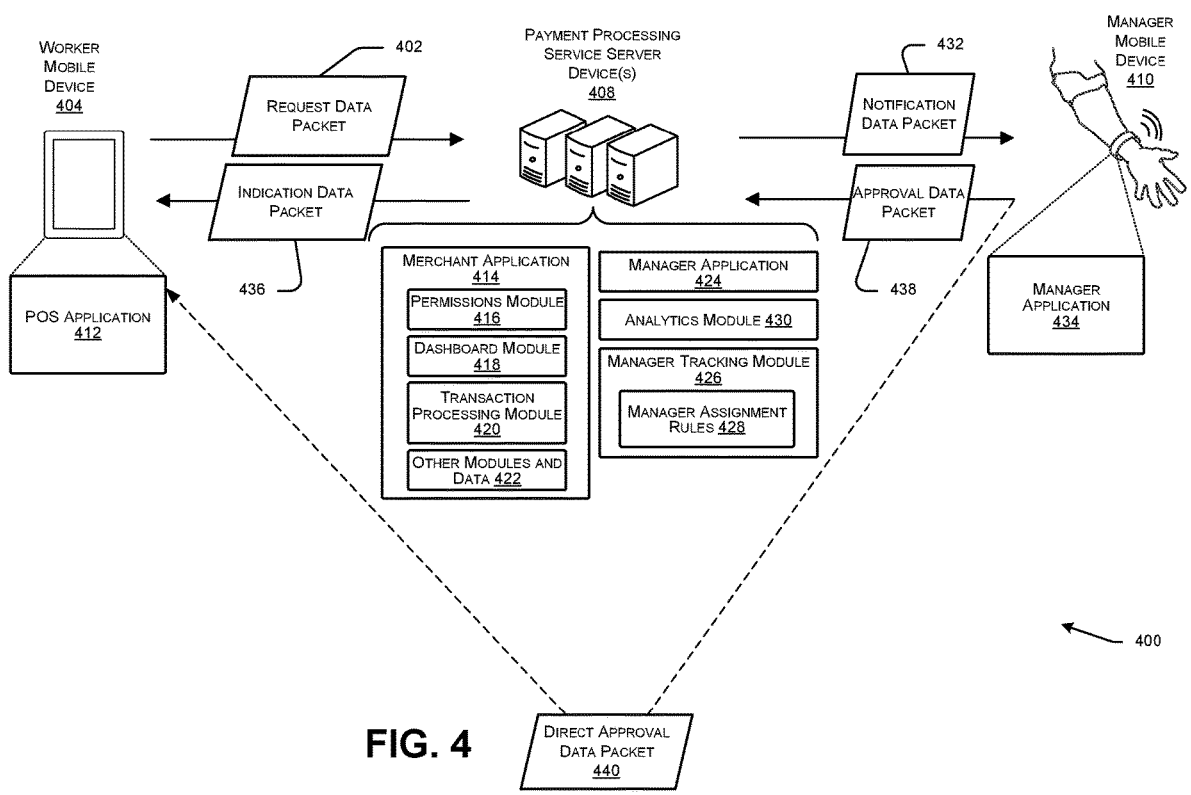
FIG. 4 illustrates a third example system, that includes payment processing service server computer(s), for requesting and/or provisioning manager approvals, as described herein.

FIG. 4 illustrates a third example system 400, that includes payment processing service server computer(s), for requesting and/or provisioning manager approvals, as described herein. System 400 represents a configuration in which a worker mobile device 404 transmits a request data packet 402 comprising a request for manager approval to a merchant application 406, via an intermediate device such as payment processing service server device(s) 408. In such a configuration, payment processing service server device(s) 408 can process request data packet 402 and then can send a notification data packet 432 comprising a notification of the request to a manager mobile device 410. Although FIG. 4 describes one worker mobile device 404 and one manager mobile device 410, any number of worker mobile devices and manager mobile devices can be used.

FIG. 4 illustrates worker mobile device 404 (which can correspond to worker mobile device 202, 302) and POS application 412 (which can correspond to POS application 208, 312) executing on worker mobile device 404. POS application 412 can configure worker mobile device 404 as a POS terminal and can determine, among performing other operations as described above with reference to POS application 208 above, transaction data associated with POS transactions.

In the example illustrated in FIG. 4, worker mobile device 404 can send a request data packet 402 comprising the request for manager approval to payment processing service server device(s) 408. In FIG. 4, payment processing service server device(s) 408 receives request data packet 402. In the example illustrated in FIG. 4, a merchant application 414 executing on payment processing service server device(s) 408 can receive request data packet 402. Merchant application 414 can include one or more modules, including, but not limited to, a permissions module 416, a dashboard module 418, a transaction processing module 420, and other modules and data 422. The modules and/or data of merchant application 414 can be arranged in a distributed fashion such that one or more may be stored on worker mobile device 404, payment processing service server device(s) 408, manager mobile device 410, etc. In the example illustrated in FIG. 4, payment processing service server device(s) 408 can additionally or alternatively store thereon a manager application 424, which can have same or similar structure and/or function as manager application 316, described above with reference to FIG. 3.

Manager application 424 can include modules including, but not limited to, a permissions module, a dashboard module, and/or notifications module. Manager application 424 can store data including, but not limited to, permissions data, pending requests data, priority rules, and/or state data. Additionally, manager application 424 can include manager tracking module 426 and manager assignment rules 428. Manager application 424 can also include other modules and data. The modules and/or data of manager application 424 can be arranged in a distributed fashion such that one or more may be stored on worker mobile device 404, payment processing service server device(s) 408, manager mobile device 410, etc.

Manager application 424 can additionally or alternatively receive request data packet 402 from worker mobile device 404 and perform similar functions regarding request data packet 402 as those described for manager application 316 in reference to FIG. 3.

Additionally, manager application 424 includes analytics module 430. Analytics module 430 can aggregate and analyze, among other things, data relevant to requests for manager approval. In an example, in response to a request from a manager, analytics module 430 can access data relevant to requests for manager approval stored by payment processing service server device(s) 408, including transaction data stored by the transaction processing module 420 of merchant application 414. In an example, transaction data relates to multiple merchants that includes, but is not limited to, merchant name, customer identifier, transaction amount, payment card used, comps, voids, tip amount, etc. In an example, analytics module 430 additionally accesses data stored by manager application 424 related to requests for manager approval. Based at least in part on the data, analytics module 430 can perform data analysis to generate statistics, charts, rankings, and reports regarding historical requests for manager approval made by workers at the merchant. Manager application 424 can cause the data to be presented on a display of payment processing service server device(s) 408 via a dashboard generated by dashboard module 428. Additionally or alternatively, manager application 424 can cause the data to be presented via a UI to present analytics Analytics modules 430 can provide recommendations to a merchant regarding manager approvals. For example, analytics module 430 can provide recommendations regarding under what circumstances a merchant should grant a request for manager approval and/or a recommendation on a limit on the number of particular requests a merchant should allow. Analytics module 430 can analyze transaction data and data related to requests for manager approval. In some examples, analytics module 430 can transmit an authorization signal to manager mobile device 410 in association with notification data packet 432. The authorization signal can provide a recommendation regarding approval/denial specific to a particular request, such as the request associated with request data packet 402. In some examples, managers and others associated with a merchant can submit requests for information to analytics module 430.

Manager application 424 performs similar functions with respect to receiving request data packet 402 from worker mobile device 404 and processing, displaying, and sending notifications of the request associated with request data packet 402 as manager application 210, 316 can. Manager application 424 may be able to access more data (e.g.,
transaction data from merchant application 414) in determining whether the state of a transaction satisfies a condition. This increased access stems from the inclusion of payment processing service server device(s) 408 in the system of FIG. 4.

Payment processing service server device(s) 408 can include a manager tracking module 426 that performs similar functions to manager tracking module 318. Additionally, in the configuration illustrated in FIG. 4, manager tracking module 426 can access transaction data from merchant application 414. In an example, the transaction data can provide information including, but not limited to, what managers are currently participating in transactions, who is presently busy with a table, etc.

Additionally, manager application 424 of payment processing service server device(s) 408 can send notification data packet 432 to manager mobile device 410 in response to payment processing service server device(s) 408 receiving a new request for manager approval, re-ordering a requests queue, determining that the request associated with request data packet 402 is a request for which manager approval is needed, etc.

Manager application 434, which can be executing on manager mobile device 410, can receive notification data packet 432. Manager application 434 can cause the notification associated with notification data packet 432 to be presented on a UI of manager mobile device 410. Similar to the notification described above with respect to FIGS. 2 and 3, the notification associated with notification data packet 432 can include information about the request, and/or one or more selectable controls that allow a manager to approve or deny a request. Manager application 434 can send a request to manager application 424 and/or merchant application 414 for information and/or data analysis concerning the request.

In some examples, a manager can select a selectable control corresponding to the notification associated with notification data packet 432 that causes manager application 434 to send to manager application 424 an approval data packet 438 (comprising an approval of the request for manager approval). Manager application 434 can send instructions to manager application 424 on payment processing service server device(s) 408 to generate and/or store updated permissions for the action. The updated permissions can be temporary (e.g., expiring after the action is performed, or after the worker's shift) or permanent. In some examples, selection of the selectable control can cause manager application 434 to generate and store updated permissions.

In response to receiving approval data packet 438 associated with manager approval of the request, manager application 424 on payment processing service server device(s) 408 can perform different actions. For example, manager application 424 can remove the request from the request queue and/or send an indication of the approval to worker mobile device 404. In the example illustrated in FIG. 4, in response to payment processing service server device(s) 408 receiving approval data packet 438, POS application 412 of payment processing service server device(s) 408 sends to worker mobile device 404 an indication data packet 436 including an indication that manager approval has been provisioned.

Alternatively, in an example, manager application 424 of payment processing service server device(s) 408 can receive an indication from manager mobile device 410 that the request for manager approval was denied and send an indication of the denial to worker mobile device 404. Alternatively, in another example, manager application 424 of payment processing service server device(s) 408 can determine that a manager did not respond to the request for manager approval associated with request data packet 402 within a threshold period of time and can send a reminder to the manager mobile device 404, can send another request to a different manager (wherein the different manager can be determined at payment processing service server device(s) 408 by manager tracking module 426 according to manager assignment rules 428), or send an indication to worker mobile device 404 that the request is denied As illustrated in FIG. 4, in some cases, manager mobile device 410 can communicate directly with worker mobile device 404 to communicate manager approval via a direct approval data packet 440, without including an intermediary such as payment processing service server device(s) 408.

In the example configuration illustrated in FIG. 4, merchant application 424 of payment processing service server device(s) 408 can send indication data packet 436 to worker mobile device 404 indicating that manager approval has been provisioned. In response, worker mobile device 404 can perform the functions similar to those described above in the description of FIGS. 2 and 3.

Another example system can include both local server device(s) and payment processing service server device(s), in addition to a worker mobile device and a manager mobile device. In the example system, local server device(s) can receive the request for manager approval from the worker mobile device. The local server device(s) can determine which manager to send the request to, and then can forward the request along with data identifying the recipient manager to the payment processing service server device(s). The payment processing service server device(s) can then perform tasks similar to those described above in relation to FIG. 4, and then can send the notification of the request to the manager mobile device. In another example system, a payment processing service can receive the request for manager approval from the worker mobile device. The payment processing service can determine which manager to send the request to, and then can forward the request along with data identifying the recipient manager to the local server device(s). The payment processing service server device(s) can then perform tasks similar to those described regarding the local server device in relation to FIG. 4

While FIGS. 2-4 illustrate three example configurations of systems as described herein, in some examples, any combination of the local server device(s), payment processing service server device(s), and/or manager mobile device can perform the functions associated with each of the devices described above. That is, functions of the manager application can be distributed among and/or between any of aforementioned devices.

FIGS. 5-8 are flow diagrams illustrating example processes according to some implementations. The processes of FIGS. 5-8 are illustrated as collections of blocks in logical flow diagrams, which represent a sequence of operations, some or all of which can be implemented in hardware, software, or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 5-8 can be combined with some or all of the operations illustrated in others of FIGS. 5-8. For discussion purposes, the processes are described with reference to the environments, architectures and devices described in the examples herein, although the processes can be implemented in a wide variety of other environments, architectures, and devices.

Figure 5:
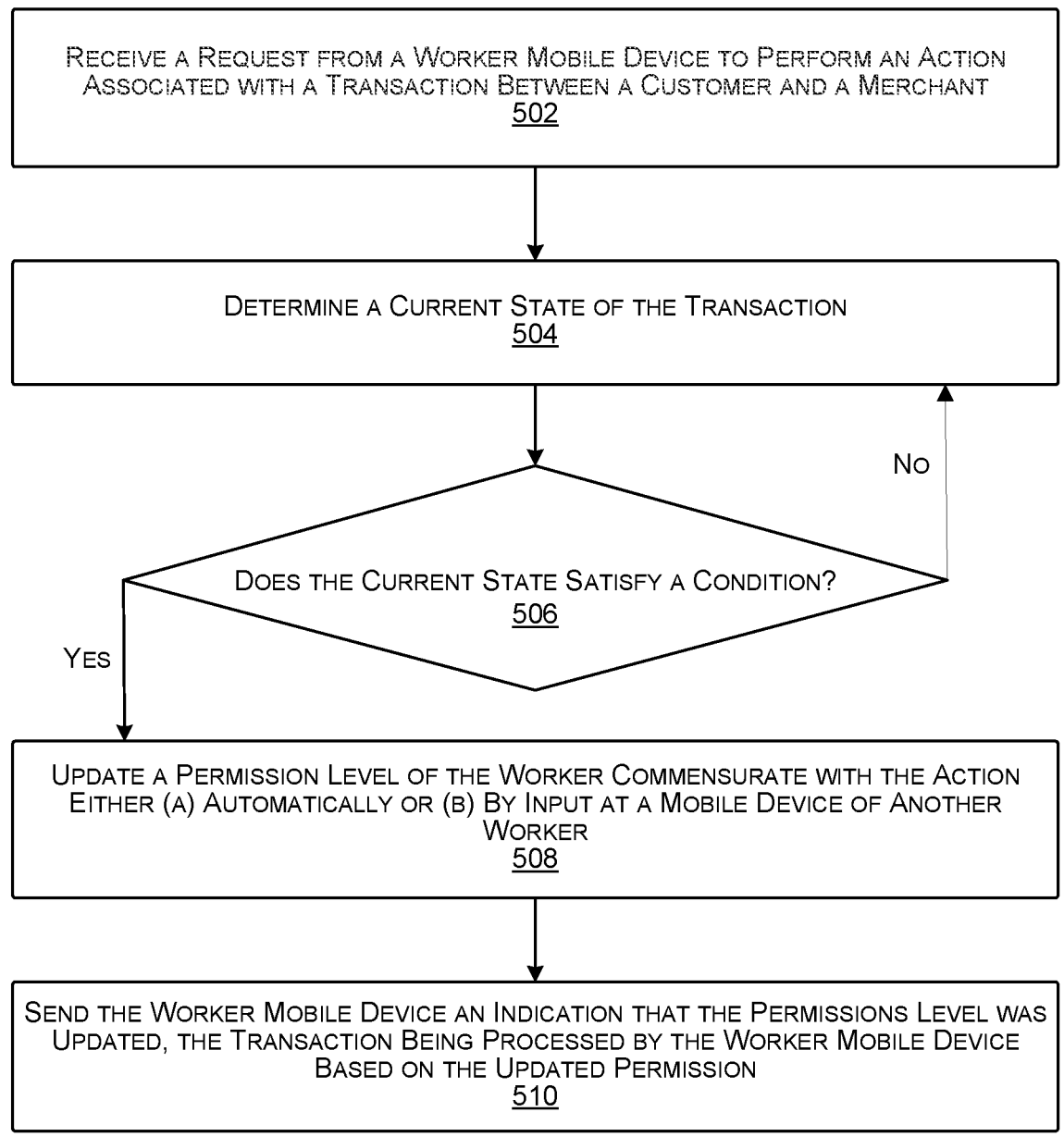
FIG. 5 is a flow diagram illustrating an example process for requesting and/or provisioning manager approvals, as described herein.

FIG. 5 is a flow diagram illustrating an example process 500 for requesting and/or provisioning manager approvals, as described herein.

Block 502 illustrates receiving a request from a worker mobile device to perform an action associated with a transaction between a customer and a merchant. The worker mobile device can be operable by a worker at a location of a merchant. A worker mobile device can send the request to devices including, but not limited to, local server device(s), payment processing service server device(s), and/or a mobile manager device. The request, in some cases, is automatically or preemptively generated and sent to the appropriate device, based at least in part on predicted delays with the request, location of a manager mobile device, historical data associated with the worker mobile device, the request, or a priority level assigned to the request. The request to perform the action can be a request for manager approval to perform the action because the action requires a different permission level than is associated with the worker.

Block 504 illustrates determining a current state of the transaction. In at least one example, a manager application can determine the current state based on state data that manager application stores. The current state of a transaction can describe characteristics of the transaction including, but not limited to, progress towards completion of a transaction, a dollar amount of a ticket, how long a ticket has been open, etc. In an example, determining a current state of a transaction can include determining whether the transaction is substantially complete.

Block 506 illustrates determining whether the current state of the transaction satisfies a condition. In at least one example, the manager application compares the state of the transaction to one or more predefined trigger conditions. In a non-limiting example, a trigger condition can be that the ticket has been open for at least two hours and/or that the transaction is substantially complete. In an example, based on determining that the transaction is substantially complete, a higher or requisite permission level can be assigned to the worker. Alternatively, based on determining that the current state of a transaction is that the transaction is not substantially complete, details of the transaction can be stored and a determination to modify the permission level is not made until the transaction is complete or substantially complete.

In another example, instead of or in addition to dynamically modifying permission levels, the worker mobile device can be instructed, via notifications, to perform additional or fewer tasks if and when the trigger conditions are met. For example, a worker can be asked to store a printed copy, save additional customer data for reporting, or take the payments via a particular instrument, and so on. These additional or fewer tasks can be tied to a risk score associated with the action.

Block 508 illustrates updating the permission level of the worker commensurate with the action either (a) automatically or (b) by input at a mobile device of another worker, based on determining that the current state of the transaction satisfies a condition. In an example in which the state of a transaction satisfies a trigger condition, the manager application can update the worker's permission level to at least a level that allows performance of the action, or similar actions. Further, such permissions can be temporary and/or conditional, for example, valid for a period of time or for a current state of the transaction. In one example, a manager can provide an authorization to update the permission level by responding to a notification of the request for manager approval displayed on mobile manager device. In another example, the manager application can automatically provide an authorization without manager review of the request. In an example in which the state does not satisfy a condition, the process returns to Block 504 to determine a current state of the transaction. The current state of the transaction may change as the worker continued to provide more context about the action, or as the transaction progresses over time.

Block 510 illustrates sending the worker mobile device an indication that the permission level was updated, the transaction being processed by the worker mobile device based on the updated or overridden permission. In some examples, manager application can send an indication of the updated permission level to a POS application of the worker mobile device. The worker mobile device can then enable the action to occur and/or process the transaction, as described above. In one implementation, the permission is reverted after the action is completed.

While the discussion above is directed to worker-manager relationships, techniques described herein can apply to any relationship between entities. For instance, in a P2P scenario, a first user can provide conditional approval for a second user to perform a payment. Or, in a lending scenario, techniques as described herein can be used to enable a first user to conditionally approve a loan for a second user.

Figure 6:
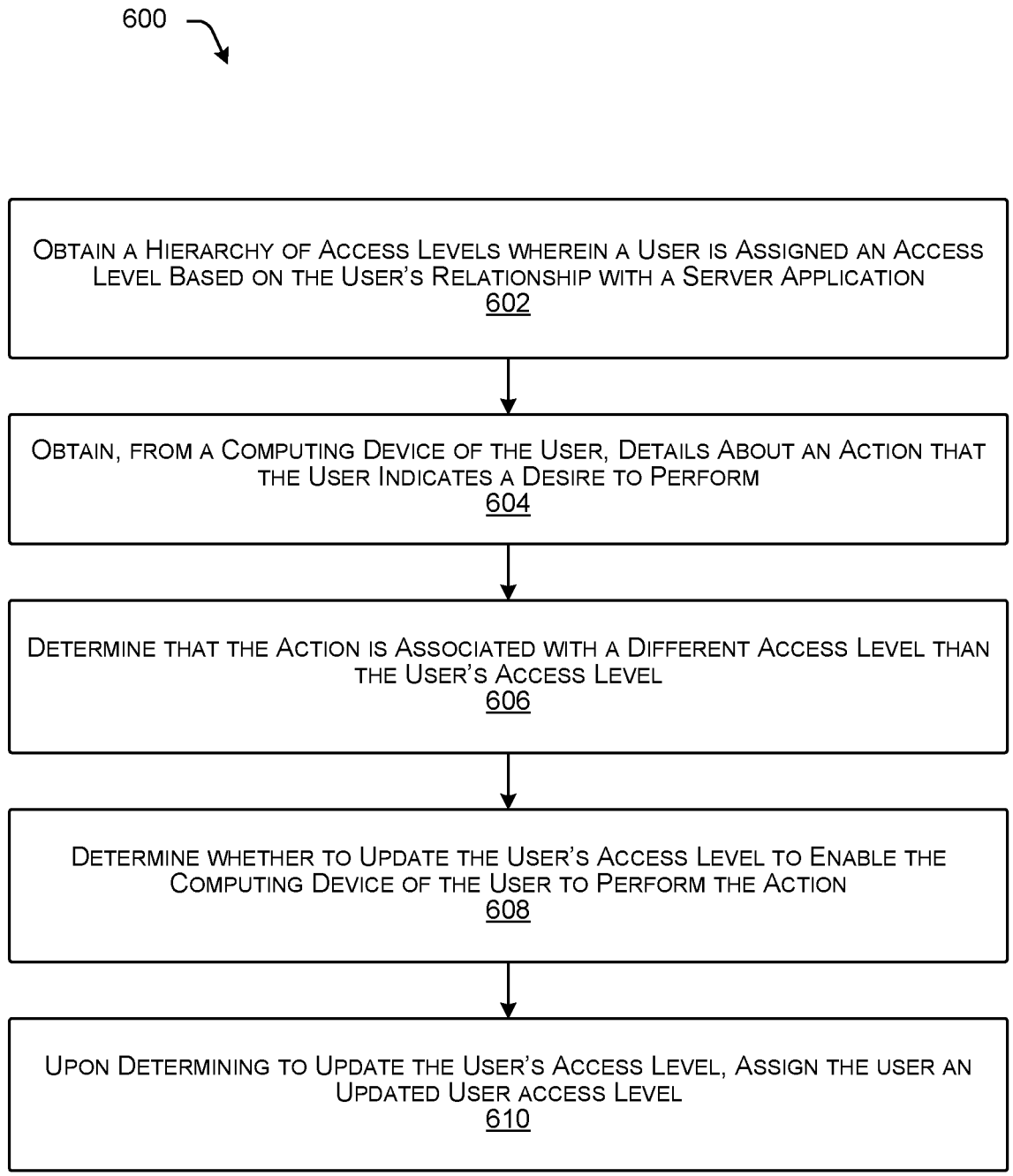
FIG. 6 is a flow diagram illustrating an example process for requesting and/or provisioning data or device access controls, as described herein.

FIG. 6 is a flow diagram illustrating an example process for requesting and/or provisioning data or device access controls, as described herein.

Block 602 illustrates obtaining a hierarchy of access levels wherein a user is assigned an access level based on the user's relationship with a server application. In an example, an access level describes one or more permissions required to access data, operate a specific device, interact with another user or another device, or perform a specific action. An access level can comprise a permission level, permissions, priority levels, restrictions, etc. An access level (and/or a permission level, permissions, priority levels, restrictions, etc.) can be associated with or represented by a data structure. In an example, a first user is assigned a first access level, a second user is assigned a second access level, and a third user is assigned a third access level. The third access level can have more and/or higher access than the second access level. The second access level can have more and/or higher access than the first access level. In other examples, access levels can be individually assigned to users and are based on the user's relationship to an application.

Block 604 illustrates obtaining, from a computing device of the user, details about an action that the user indicates a desire to perform. The user can enter input to a UI of the computing device operable by the user for an action the user would like to take but is unable to take due to the user's access level. In an example, a second device(s) can receive a data packet that includes details about the action. In an example in which the user is a first user, the action can comprise sending funds to a third user on behalf of a second user, transferring loan obligations owed to a third user from the first user to the second user, approving invoices on behalf of the second user, or modifying one or more appointments on behalf of the second user.

Block 606 illustrates determining that the action is associated with a different access level than the user's access level. In an example, the second device(s) determine that the user is associated with a first access level and determines that the action is associated with a second access level associated with more and/or higher access than the first access level.

Block 608 illustrates determining whether to update the user's access level to enable the computing device of the user to perform the action. In an example, the second device(s) can analyze characteristics of the action, user, transaction to which the action pertains, and/or other characteristics with regard to a set of rules to determine whether to enable the computing device of the user to perform the action. In some examples, the set of rules can be learned by a machine-learning mechanism. Additionally or alternatively, determining whether to update the user's access level to an is based at least in part on determining an occurrence of a trigger event. In some examples, determining whether to update the user's access level comprises forwarding the details of the action to another application executable by a third device and receiving, from the other application, an indication that approval from another user has been provided to update the user's access level, wherein determining to update the user's access is based in at least in part on receiving the indication.

Block 610 illustrates, upon determining to update the user's access level, assigning the user an updated user access level. In an example, the second device(s) can update the user's access level to the second access level so that the user can perform the requested action. Alternatively, upon determining not to update the user's access level, the second device(s) can store information regarding the requested action for a period of time and analyze the characteristics at a later time.

Figure 7:
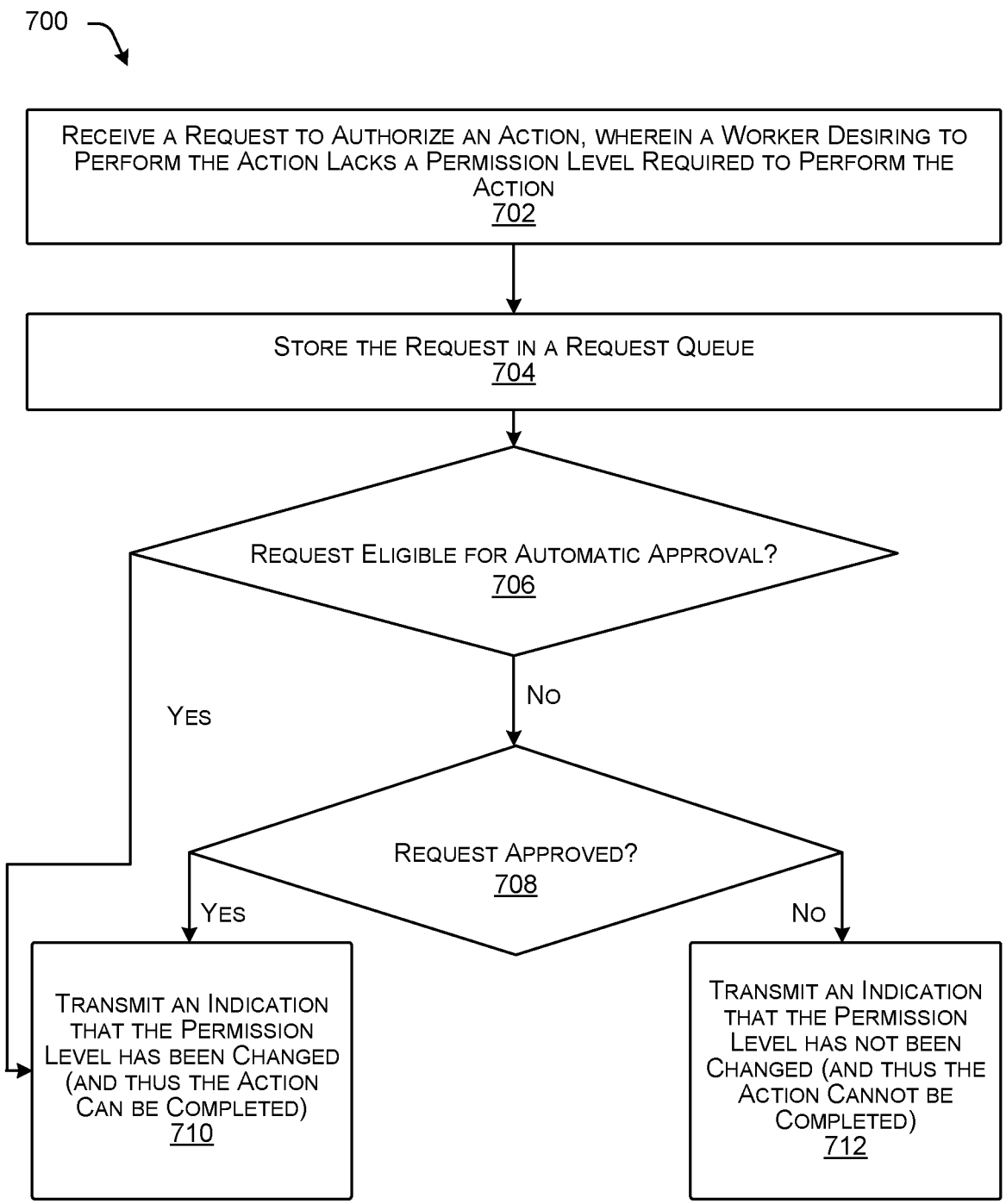
FIG. 7 is a flow diagram illustrating another example process for requesting and/or provisioning manager approvals, as described herein.

FIG. 7 is a flow diagram 700 illustrating another example process for requesting and/or provisioning manager approvals, as described herein.

Block 702 illustrates receiving a request to authorize an action from a worker who lacks a permission level required to perform the action. In the example illustrated in FIG. 2, a manager application of a manager mobile device can receive a request to authorize an action. In other examples, local server device(s) or payment processing service server device(s) can receive the request. The request can be a request for manager approval to perform actions such as a comp, a void, processing a high tip, etc. A worker mobile device can send the request.

Block 704 illustrates storing the request in a request queue. A manager application can store the request in a request queue with other requests from the same worker and/or other worker(s). The requests can be ordered according to priority rules and/or by whether a state of a transaction satisfies a trigger condition.

Block 706 illustrates determining whether the request is eligible for automatic approval. As is illustrated in FIG. 7, in an example process, the manager application determines that the request can be approved automatically, without review by a manager. The manager application can apply a set of rules to determine whether a request requires manager review and/or approval and determining whether (i) an action can be performed without manager review and/or approval (e.g., automatically approved) or (ii) the action requires manager review and/or approval. If the request can be approved automatically, the manager application can transmit an indication that the permission level has been changed to the worker mobile device. If the request requires manager review and/or approval, the request can be sent to a manager mobile device.

Block 708 illustrates determining whether the request has been approved, based on determining that the request is not eligible for automatic handling. If the request is not eligible for automatic handling, the request can be submitted for manager review. That is, the request can be sent to a manager mobile device. In some examples, a manager can provide authorization for the action based on review of the request. In some examples, a manager can authorize the action by interacting with a notification displayed on the manager mobile device.

Block 710 illustrates transmitting an indication to the worker mobile device that the permission level has been changed and thus that the action can be completed, based on determining that the request is eligible for automatic handling (at Block 706), and/or based on determining that the request was approved (at Block 708). The POS application of the worker mobile device can receive the indication. In some examples, the POS application can perform the action for which manager approval was provided. In some examples, based on performance of the action or as part of performance of the action, a payment processing module of the worker mobile device can process the transaction associated with the request for manager approval.

Block 712 illustrates transmitting an indication to a worker mobile device that the permission level has not been changed and thus that the action cannot be completed, based on determining that the request was not approved.

While the discussion above is directed to worker-manager relationships, techniques described herein can apply to any relationship between entities. For instance, in a P2P scenario, a first user can provide conditional approval for a second user to perform a payment. Or, in a lending scenario, techniques as described herein can be used to enable a first user to conditionally approve a loan for a second user.

Figure 8:
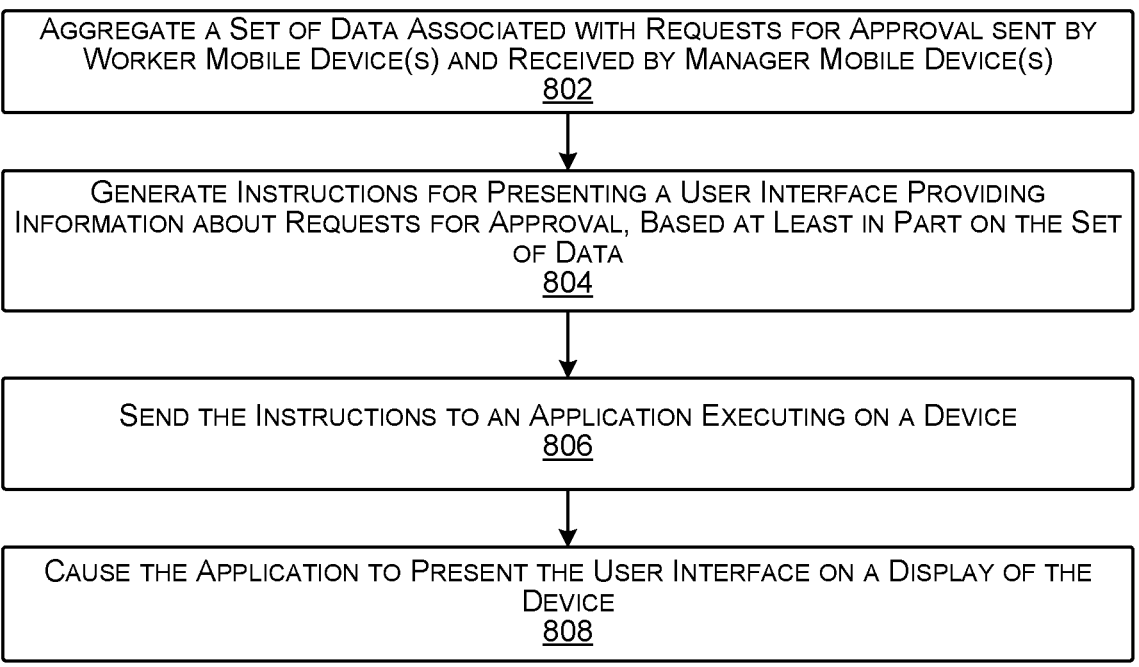
FIG. 8 is a flow diagram illustrating an example process for generating a user interface ("UI"), as described herein.

FIG. 8 is a flow diagram illustrating an example process for generating a UI, as described herein. This process can be performed by application(s) on at least worker mobile device(s), local server device(s), payment processing service server device(s), and/or manager mobile device(s). In some examples, an application (for example, a POS application and/or a manager application) can both generate instructions for presenting a UI and execute such instructions for presenting the UI. Alternatively, in other examples, a first application can generate instructions for generating a UI and send the instructions to a second application and the second application can execute the received instructions for presenting the UI. In some instances, the first application and the second application can be executing on different computing devices.

Block 802 illustrates aggregating a set of data associated with request for approval sent by worker mobile device(s) and received by manager mobile device(s). In at least one example, a manager application on a manager mobile device can store and aggregate data associated with requests for manager approval that the manager mobile device or other devices executing the manager application have received. In some examples, the set of data can relate to historical manager approval requests of a merchant, a particular pending request for manager approval, a plurality of pending requests for manager approval, a pending transaction associated with a merchant, permissions and/or permission levels, and/or trigger condition. In some configurations described above, local server device(s) or payment processing service server device(s) executing the manager application can aggregate the set of data. In at least one example, payment processing service server device(s), because of their access to transaction data from multiple merchants, may aggregate more or different data than the manager mobile device and/or the local server device(s) (e.g., historical requests for manager approval of other merchants, historical transactions of other merchants). In some examples, the set of data can be stored in computer-readable media of a device such as worker mobile device(s), local server device(s), payment processing service server device(s), or manager mobile device(s).

Block 804 illustrates generating instructions for presenting a UI providing information about requests for approval, based at least in part on the set of data. An application (including, but not limited to a POS application, a merchant application, or a manager application executing on a device (e.g., worker mobile device; local server device(s); payment processing service server device(s); manager mobile device) can, via one or more processors(s) of the device, generate instructions for presenting a UI. In a non-limiting example, the manager application executing on the payment processing service server device(s) can generate instructions for presenting a UI that provides a graphical representation of data, stored at least on the payment processing service server device(s), associated with historical requests for manager approval.

Block 806 illustrates sending the instructions to an application executing on a device. For example, the instructions can be sent to another application executing on a same device as the device that generated the instructions. Alternatively, the instructions can be sent to an application executing on a different device from the device that generated the instructions. For instance, the payment processing service server device(s) can send, to a manager mobile device, instructions for presenting a UI that illustrates data associated with historical requests for approval. In another example, a device that generated the instructions can display the UI.

Block 808 illustrates causing the application to present the UI on a display of the device. In at least one example, UI can be presented via a web browser, or the like. In other examples, UI can be presented via the application to which the UI was sent. For instance, a manager application executing on the payment processing service server device(s) can cause a manager application executing on a manager mobile device(s) to present the UI illustrating data associated with historical requests for manager approval.

Figure 9:
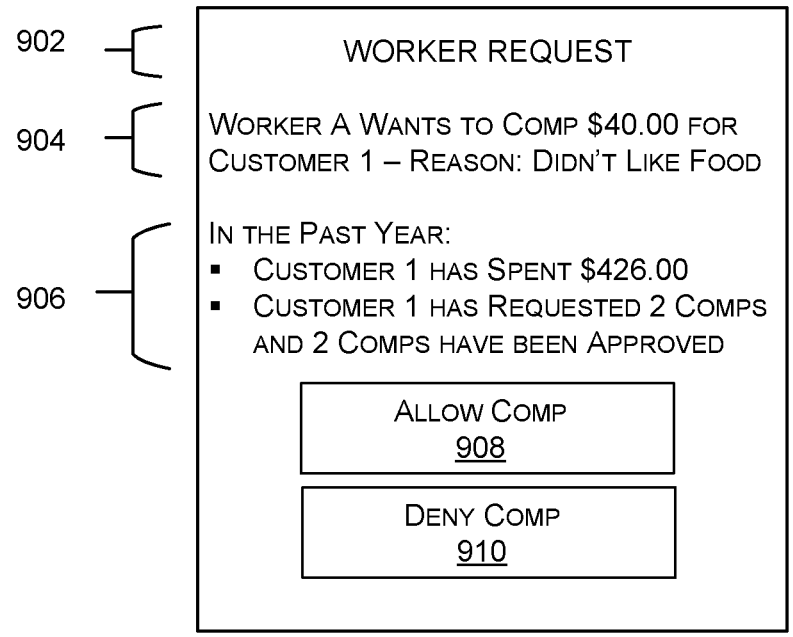
FIG. 9 illustrates an example UI that notifies a manager of a request for a manager approval, as described herein.

FIG. 9 illustrates an example UI 900 for presenting a UI that notifies a manager of a request for a manager approval, as described herein.

As described above, in an example, a worker mobile device sends a request for manager approval (1) directly to a manager mobile device or (2) indirectly to a manager mobile device (e.g., via local server device(s) and/or remote server device(s)), which sends a notification of the request to a manager mobile device. A module of a manager application (e.g., a dashboard module, a notifications module, or other modules and data) executing on the manager mobile device causes the notification to be displayed via a UI on the manager mobile device.

In the example illustrated in FIG. 9, UI 900 illustrates a notification that a worker is requesting manager approval to comp $40.00 for a customer. In an example, UI 900 can be displayed via a UI on the manager mobile device.

UI 900 can include a title 902 ("Worker Request" as illustrated), a description 904 of the action the worker wishes to perform ("Worker A wants to comp $40.00 for Customer 1," as illustrated) and a reason for desiring such action ("didn't like food"), and additional information 906 about the request. In the non-limiting example that is illustrated in FIG. 9, the additional information 906 is a summary of how much the customer has spent at the merchant in the past year, several requests made by the customer, and an approval rate for the requests. Additional or alternative information can be surfaced via such additional information 906.

In some examples, selectable control 908 can be presented as part of UI 900 in association with the notification. In an example, selection of selectable control 908 can cause the authorization of the worker request (e.g., by a permissions module). In an example, a permissions module of the manager application (which can be executing on the manager mobile device, local server device(s), or payment processing service server device(s)) can authorize the request and update a permission level of the worker and/or a permission of the worker for the requested action. Additionally or alternatively, an update to the permission level and/or permission of the worker can be received at a POS application executing on the local server device(s) and/or a permissions module executing on the worker mobile device (and/or the permissions module of a merchant application executing on the payment processing service server device(s)). In some examples, selection of selectable control 908 can cause an indication of the approval to be sent to the worker mobile device to be displayed via a UI, either directly as illustrated in FIG. 2, or indirectly (e.g., via a server device) as illustrated in FIGS. 3 and 4.

UI 900 is also illustrated as including selectable control 910 ("Deny Comp"). Selection of selectable control 910 indicates a denial of the worker's request. Selection of selectable control 910 can cause the manager application to send an indication of the denial to the worker mobile device, either directly or indirectly. The worker mobile device can display the indication. Selection of selectable control 910 can leave the permission level and permissions of the worker intact, such that worker is unable to perform the requested action (in UI 900, the requested action is a comp). In some examples, a denial can be temporarily. That is, the request can be added to a request queue and surfaced to the manager at a later time.

UI 900 can include additional or alternative information and/or components, and additional or alternative configurations are within the scope of this disclosure. That is, UI 900 should not be construed as limiting. It should be noted that while selectable controls 908 and 910 are shown, as described above, any input mechanism can be used to allow or deny a request. In some examples, if no action is taken by the manager, such inactivity can constitute a denial (or approval, in some examples).

Figure 10:
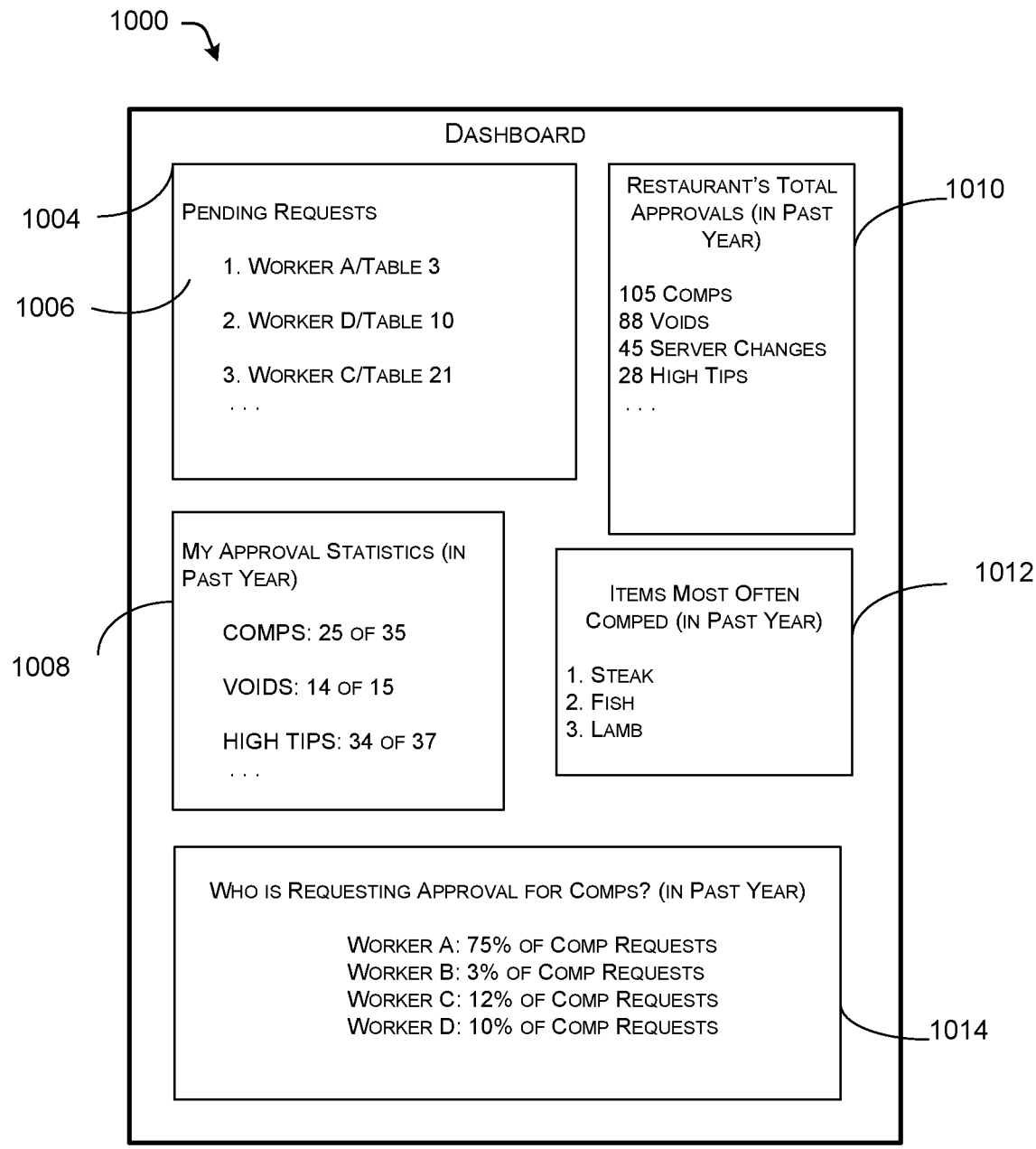
FIG. 10 illustrates an example UI that provides analytics associated with manager approvals and/or requests, as described herein.

FIG. 10 illustrates an example UI 1000 that provides analytics associated with manager approvals and/or requests, as described herein.

In an example, a manager application can display UI 1000 in association with a new request for manager approval from a worker mobile device or upon request of a manager. UI 1000 provides a dashboard of information and/or statistics relevant to requests for manager approval. UI 1000 provides information on pending requests 1004, which can provide a partial and/or complete queue 1006 of pending requests for manager approval. Queue 1006 can be in an order of priority (e.g., which can correspond to the request queue described above). In some examples, selectable controls (not shown) can be displayed adjacent to the requests. In such examples, the selectable controls, when selected, indicate a manager's approval or denial of a request for manager approval. As described above, other input mechanisms can be used to indicate approval or denial.

Additionally or alternatively, UI 1000 can illustrate data about a particular manager's approvals/denials 1008, overall approval statistics 1010 for a past year for a merchant associated with a worker and/or a manager, a comparison between workers' requests for manager approval 1014, a comparison between managers' approvals/denials (not shown), the most comped items of a merchant 1012, etc. Additional or alternative analytics can be imagined.

Data for UI 1000 can be stored and/or analyzed at combinations of payment processing service server device(s), local server device(s), a manager mobile device, and/or the worker mobile device. In an example, the payment processing service server device(s) can store at least some of the data for UI 1000. To generate various components of UI 1000, an analytics module of a manager application executing on the payment processing service server device(s) can analyze data from transactions processed by the payment processing service server device(s) and data related to requests for manager approval such as pending requests data, state data, and other data. In another example, local server device(s) can store at least some data for UI 1000. The local server device(s) can generate aspects of UI 1000 based on data from requests for manager approval such as pending requests data, state data, and other data, as well as data received from other devices. UI 1000 can be updated in real time or near-real time based at least in part on changes in data. In some examples, data for UI 1000 can be included in the input data used by manager application (e.g., manager application 210) to train data model(s) for purposes such as determining whether a request can be automatically handled or requires manager review.

As noted above, pending requests information 1004 can provide a queue 1006 of pending requests for manager approval. Queue 1006 can include requests from a manager associated with a device displaying UI 1000, as well as requests from other managers associated with the merchant. Details for each request can vary in amount and specificity. In the example shown, the list of pending requests includes the worker and table associated with the request and the rank of the request. UI 1000 can additionally or alternatively include, but is not limited to, a time a worker made a request, customer name, item at issue, etc. A partial list and/or a full list can be displayed. In some examples, queue 1006 can dynamically updated in real time or near-real time. For example, queue 1006 can be updated in response to pending requests being approved, in response to a change in the order of the requests, or in response to new requests being added.

Queue 1006 can include requests corresponding to open tickets. An "open ticket" as used herein can comprise a data record associated with an order for which payment for which payment has not been rendered. In some examples, requests in queue 1005 are the ones that are requests corresponding to open tickets from all employees, devices, and/or locations associated with the merchant. In other examples, requests in queue 1005 can include open tickets for a subset of employees, devices, locations, etc.

Approval statistics 1008 provide statistics regarding a particular manager's request approvals. UI 1000 illustrates statistics for the manager associated with the instance of the manager application executing on the manager mobile device on which UI 1000 is displayed. Approval statistics 1008 can be delineated by type of request for manager approval (e.g., comp, void, high tip, ticket transfer to another worker, etc.). A partial list of approval statistics can be initially displayed and can be expanded to display additional approval statistics.

A merchant's total approvals of requests for approval over a period of time 1010 can also be displayed as part of UI 1000. For example, a merchant's total approvals of requests for manager approval in the past year can be provided. Total approvals can include data from all workers and all managers, and can represent approved requests for manager approvals (e.g., excluding ignored and denied requests)

Items that managers of the merchant most often comp (e.g., that managers comp at a frequency above a threshold, a count, etc.) over a period of time 1012 can also be displayed as part of UI 1000. Data associated with approved requests can include data associated with corresponding items that were comped. Menu items can be categorized by food type (e.g., a halibut dish can be categorized as fish, prime rib can be categorized as steak, etc.). UI 1012 can show a merchant which food types are receiving the most comps.

Statistics comparing worker's requests for approval can also be provided as part of UI 1000. For example, UI 1014 provides percentages of all comp requests made by each worker in the past year. In other examples, UI 1014 can illustrate worker request percentages for other types of requests for approval.

UI 1000 can be used to inform decisions on pending requests. For example, a manager may choose to deny a request from Worker A based on information displayed in UI 1014 that shows Worker A has made 75% of a merchant's requests for comps in the past year. Additionally or alternatively, UI 1000 can be used to inform future decisions (e.g., employment decisions, menu offerings, etc.).

UI 1000 can include additional or alternative information and/or components. As noted above with respect to FIG. 9, FIG. 10 is a non-limiting example of a UI that can present information associated with requests (e.g., pending and/or historical) and additional or alternative configurations are within the scope of this disclosure.

Figure 11:
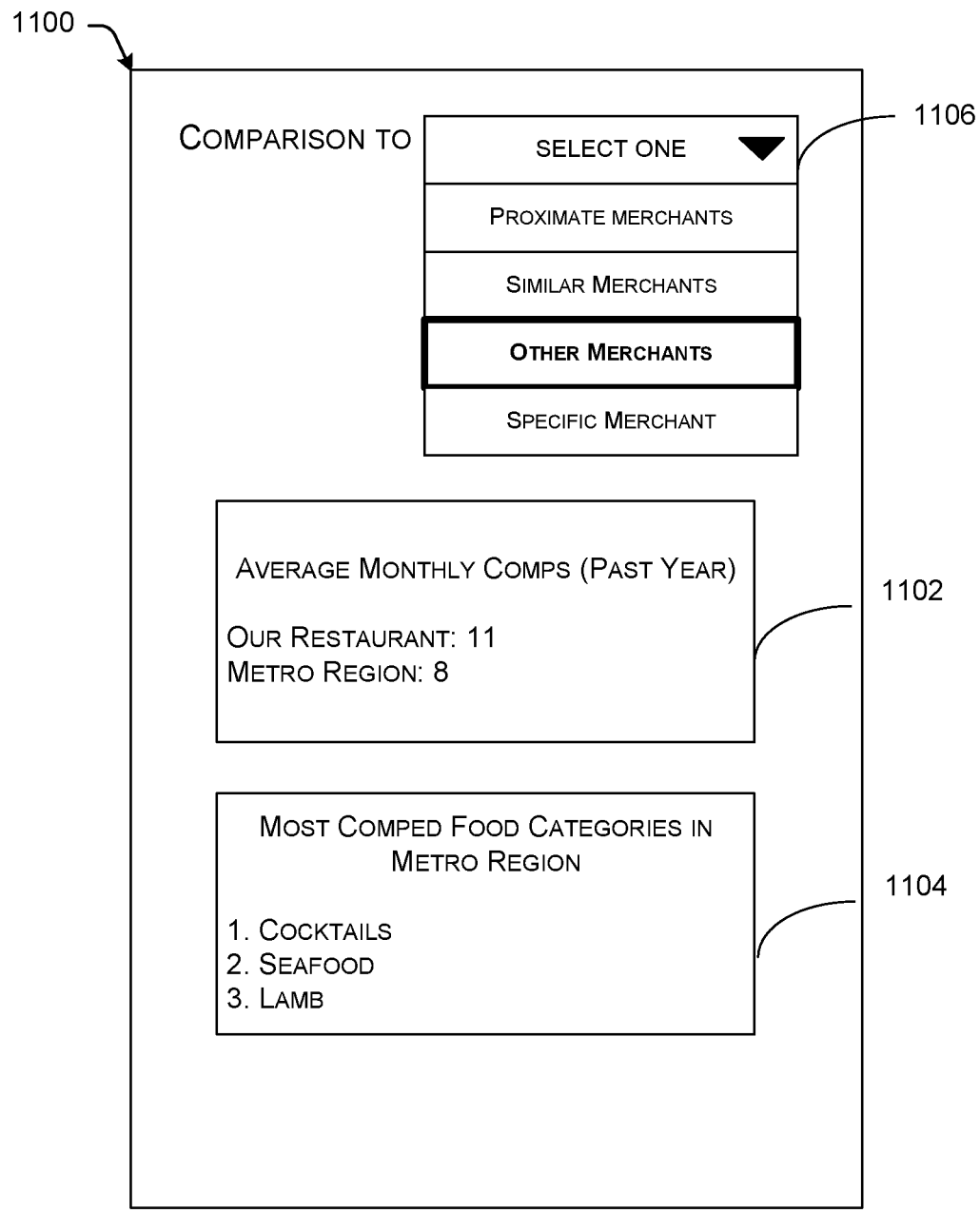
FIG. 11 illustrates an example UI that provides information regarding manager approvals, as described herein.

FIG. 11 illustrates an example UI 1100 that provides information regarding manager approvals, as described herein.

In an example, UI 1100 provides comparisons between a merchant associated with a manager mobile device and other merchants.

In some examples, payment processing service server device(s) can generate UI 1100 for display on the manager mobile device. Payment processing service server device(s) can store transaction data for transactions conducted by a plurality of merchants with respective customers, including those of a merchant associated with UI 1100. Payment processing service server device(s) can also store data pertaining to manager approval requests and approvals obtained from a plurality of merchants, as part of the transaction data or independent of the transaction data. As described above, payment processing service server device(s) can execute a manager application that includes an analytics module. The analytics module can analyze transaction data and request data from a plurality of merchants that are associated with a payment processing service and can generate data regarding requests for manager approval across all or some of the plurality of merchants, which can be provided in UI 1100 to the manager device. UI 1100 can provide a comparison 1104 of average monthly comps in the past year between a merchant associated with the merchant mobile application on one hand and merchants in the merchant's metro region on the other hand. This information can provide a merchant insight into customer satisfaction, worker aptitude, and/or food quality, for example. Additionally, UI 1100 provides a list 1104 of the food that merchants in a metro region most often comp. As discussed above in relation to box 1012 of FIG. 10, the payment processing service server computer(s) can extract a relevant food category from an item for which a comp was given; FIG. 11 illustrates an extraction and analysis that has been performed for restaurants in an entire metro region. A merchant can compare this data with the merchant's own comp statistics.

UI 1100 can include additional or alternative information and/or components. As noted above with respect to FIGS. 9 and 10, FIG. 11 is a non-limiting example of a UI that can present information associated with requests (e.g., pending and/or historical) and additional or alternative configurations are within the scope of this disclosure.

FIG. 12 illustrates an example UI 1200 that provides information regarding workers' performance, as described herein.

In an example, UI 1200 provides information for a manager regarding job performance of a plurality of workers of a merchant.

In some examples, payment processing service server device(s) can generate UI 1200 for display on a manager mobile device. The payment processing service server device(s) can store data regarding how many hours the worker has worked in the past month, a number of tables the worker has served, total revenue from the tables the worker has served, and a number of requests for approval the worker has submitted, at this or other merchant locations/merchants.

The payment processing service server device(s) can generate UI 1200 using transaction data stored by a merchant application on the payment processing service server device(s). The transaction data can include dollar values of tickets submitted for processing by a POS application executing on a worker mobile device. The transaction data can also include identification of the worker associated with each ticket. Additionally or alternatively, the payment processing service server device(s) can generate UI 1200 using data related to requests for approval stored by a manager application executing on the payment processing service server device(s). Data related to requests for approval can include data described above with respect to an analytics module, and can include a quantity of requests for approval from a worker, disposition of the requests (e.g., approved, denied, expired), a type of request (e.g., comp, void, high tip, ticket transfer, etc.), etc.

UI 1200 is an example of a UI that the payment processing service server device(s) can generate with transaction data and/or data related to requests for approval. In some examples, the payment processing service server device(s) can generate additional UIs using transaction data and/or data related to requests for approval. For instance, UIs using transaction data and/or data related to requests for approval can include information regarding profits and loss of the restaurant, items sold, how much time a worker spent at a table, how busy the merchant is at points in time, information described above with respect to FIGS. 9 to 11, the analytics data, etc. In some examples, merchants and/or managers can use information presented via UI 1200 to inform business decisions and improve performance of staff. UI 1200 can include additional or alternative information and/or components.

Figure 13:
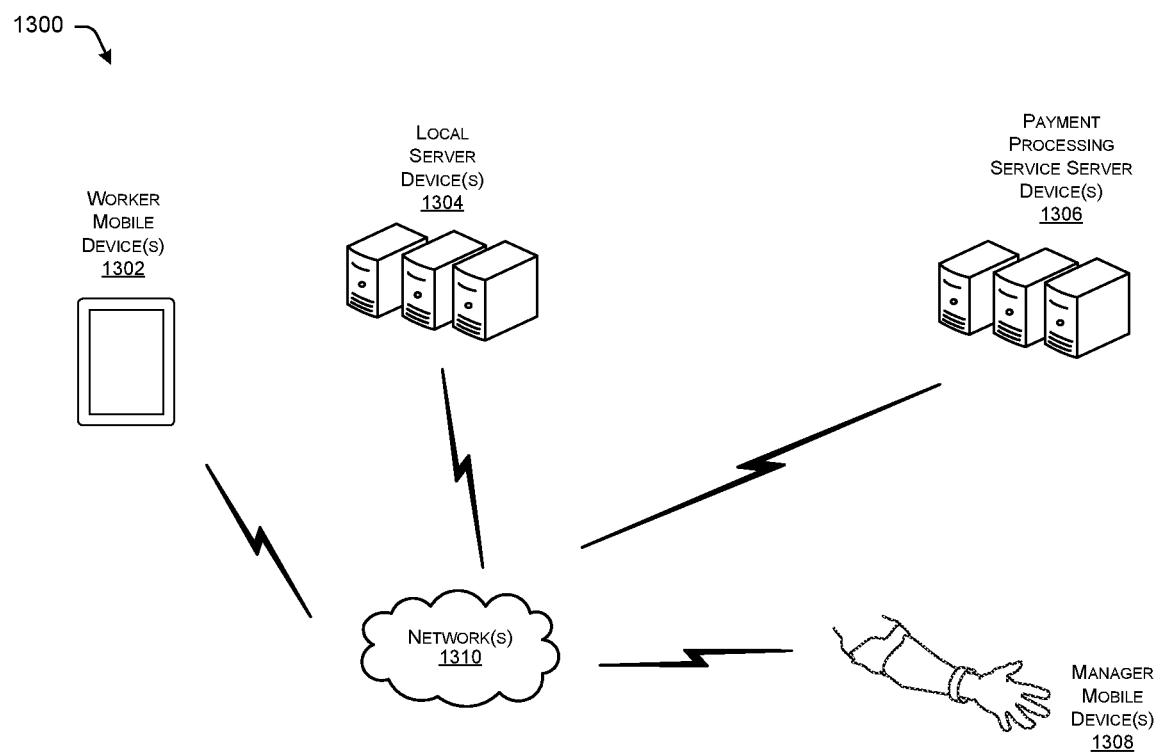
FIG. 13 illustrates an example system for requesting and/or provisioning manager approvals, as described herein.

FIG. 13 illustrates an example system 1300 for requesting and/or provisioning manager approvals, as described herein. System 1300 includes worker mobile device(s) 1302, local server device(s) 1304, payment processing service server device(s) 1306, and manager mobile device(s) 1308 that communicate with each other via network(s) 1310 (e.g., the Internet, cable network(s), cellular network(s), wireless network(s) (e.g., Wi-Fi) and wired network(s), as well as close-range communications such as Bluetooth®, Bluetooth® low energy, and the like)). While a single worker mobile device 1302, local server device 1304, payment processing service server device 1306, and manager mobile device 1308 are illustrated, in additional or alternate examples, system 1300 can have multiple worker mobile devices 1302, local server devices 1304, payment processing service server devices 1306, and manager mobile devices 1308.

At least some components and functions of, and interactions between, devices in example system 1300 are described above (at least with respect to FIGS. 1-4) and below (at least with respect to FIGS. 14-17).

Figure 14:
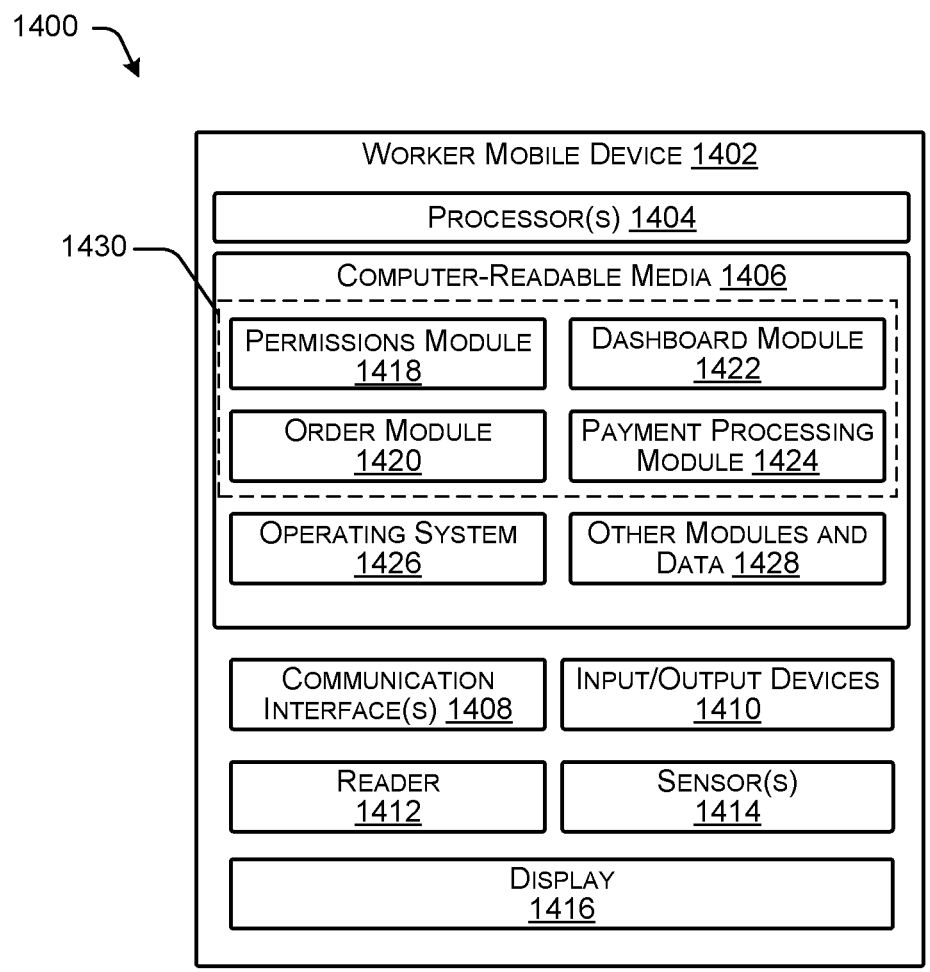
FIG. 14 illustrates a block diagram of select components of worker mobile device(s), as described herein.

FIG. 14 illustrates a block diagram 1400 of select components of a worker mobile device 1402, as described herein.

In at least one example, worker mobile device 1402 can be any suitable type of mobile device, e.g., portable, semi-portable, or semi-stationary. Some examples of worker mobile device 1402 can include tablet computing devices; smart phones and mobile communication devices; laptops, netbooks and other portable computers or semi-portable computers; wearable computing devices, or other body-mounted computing devices; augmented reality devices; or other computing devices capable of sending communications and performing the functions according to the techniques described herein.

In the illustrated example, worker mobile device 1402 can include one or more processors 1404, one or more computer-readable media 1406, one or more communication interfaces 1408, and one or more input/output (I/O) devices 1410. Each processor 1404 can itself include one or more processors or processing cores. For example, the one or more processors 1404 can be implemented as one or more microprocessors, microcomputers, microcontrollers, digital signal processors, central processing units, state machines, logic circuitries, and/or any devices that manipulate signals based on operational instructions. In some examples, the one or more processors 1404 can be one or more hardware processors and/or logic circuits of any suitable type specifically programmed or configured to execute the algorithms and processes described herein. The one or more processors 1404 can be configured to fetch and execute computer-readable processor-executable instructions stored in computer-readable media 1406.

Depending on the configuration of worker mobile device 1402, computer-readable media 1406 can be an example of tangible non-transitory computer storage media and can include volatile and nonvolatile memory and/or removable and non-removable media implemented in any type of technology for storage of information such as computer-readable processor-executable instructions, data structures, program modules or other data. Computer-readable media 1406 can include, but is not limited to, RAM, ROM, EEPROM, flash memory, solid-state storage, magnetic disk storage, optical storage, and/or other computer-readable media technology. Further, in some examples, worker mobile device 1402 can access external storage, such as RAID storage systems, storage arrays, network attached storage, storage area networks, cloud storage, or any other medium that can be used to store information and that can be accessed by the one or more processors directly or through another computing device or network. Accordingly, computer-readable media 1406 can be computer storage media able to store instructions, modules, or components that can be executed by the one or more processors 1404. Further, when mentioned, non-transitory computer-readable media exclude media such as energy, carrier signals, electromagnetic waves, and signals per se.

Computer-readable media 1406 can be used to store and maintain any number of functional components that are executable by the one or more processors 1404. In some implementations, these functional components comprise instructions or programs that are executable by the one or more processors and that, when executed, implement operational logic for performing the actions and services attributed above to worker mobile device 1402. Functional components stored in computer-readable media 1406 can include a permissions module 1418, an order module 1420, a dashboard module 1422, and a payment processing module 1424, which can comprise at least a portion of a point-of-sale (POS) application 1430. Permissions module 1418, order module 1420, dashboard module 1422, and payment processing module 1424 and the POS application 1430 can correspond to permissions module 212, order module 216, dashboard module 214, and payment processing module 218 of POS application 208, as described above with reference to FIG. 2.

Furthermore, computer-readable media 1406 can include additional functional components, such as operating system 1426 for controlling and managing various functions of worker mobile device(s) 1402 and for enabling basic user interactions. In addition, computer-readable media 1406 can also store data, data structures and the like, that are used by the functional components.

Depending on the type of worker mobile device 1402, computer-readable media 1406 can also optionally include other functional components and data, such as other modules and data 1428, which can include programs, drivers, etc., and the data used or generated by the functional components. For instance, in some examples, worker mobile device 1402 can include a payroll module, an inventory management module, an employee management module, a financing module, an appointment module, etc., which can facilitate payroll services, inventory management services, employee management services, financing services, appointment services, etc., respectively. Further, worker mobile device 1402 can include many other logical, programmatic, and physical components, of which those described are merely examples that are related to the discussion herein.

Communication interface 1408 can include one or more interfaces and hardware components for enabling communication with various other devices, such as over network(s) or directly. For example, communication interface 1408 can enable communication through one or more network, which can include, but are not limited to any type of network known in the art such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. A network can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Worker mobile device 1402 can further include one or more I/O devices 1410. I/O devices 1410 can include speakers, a microphone, a camera, and various user controls (e.g., buttons, a joystick, a keyboard, a keypad, etc.), a haptic output device, and so forth.

In at least one example, worker mobile device 1402 can include display 1416. Depending on the type of computing device(s) used as worker mobile device 1402, display 1416 can employ any suitable display technology. For example, display 1416 can be a liquid crystal display, a plasma display, a light emitting diode display, an OLED (organic light-emitting diode) display, an electronic paper display, or any other suitable type of display able to present digital content thereon. In some examples, display 1416 can have a touch sensor associated with display 1416 to provide a touchscreen display configured to receive touch inputs for enabling interaction with a graphic interface presented on display 1416. Accordingly, implementations herein are not limited to any particular display technology. Alternatively, in some examples, worker mobile device 1402 may not include display 1416, and information can be presented by other means, such as aurally.

In addition, worker mobile device 1402 can include or can be connectable to card reader 1412. In some examples, card reader 1412 can plug in to a port in worker mobile device 1402, such as a microphone/headphone port, a data port, or other suitable port. Card reader 1412 can include a read head for reading a magnetic strip of a payment card, and further can include encryption technology for encrypting the information read from the magnetic strip. Alternatively, numerous other types of card readers can be employed with worker mobile device 1402 herein, depending on the type and configuration of worker mobile device 1402.

Other components included in worker mobile device 1402 can include GPS device (not shown) that is able to indicate location information. Further, worker mobile device 1402 can include one or more sensors (not shown), such as an accelerometer, gyroscope, compass, proximity sensor, camera, microphone, and/or a switch, as discussed above. Additionally, worker mobile device 1402 can include various other components that are not shown, examples of which include removable storage, a power source, such as a battery and power control unit, a barcode scanner, a printer, a cash drawer, and so forth.

Figure 15:
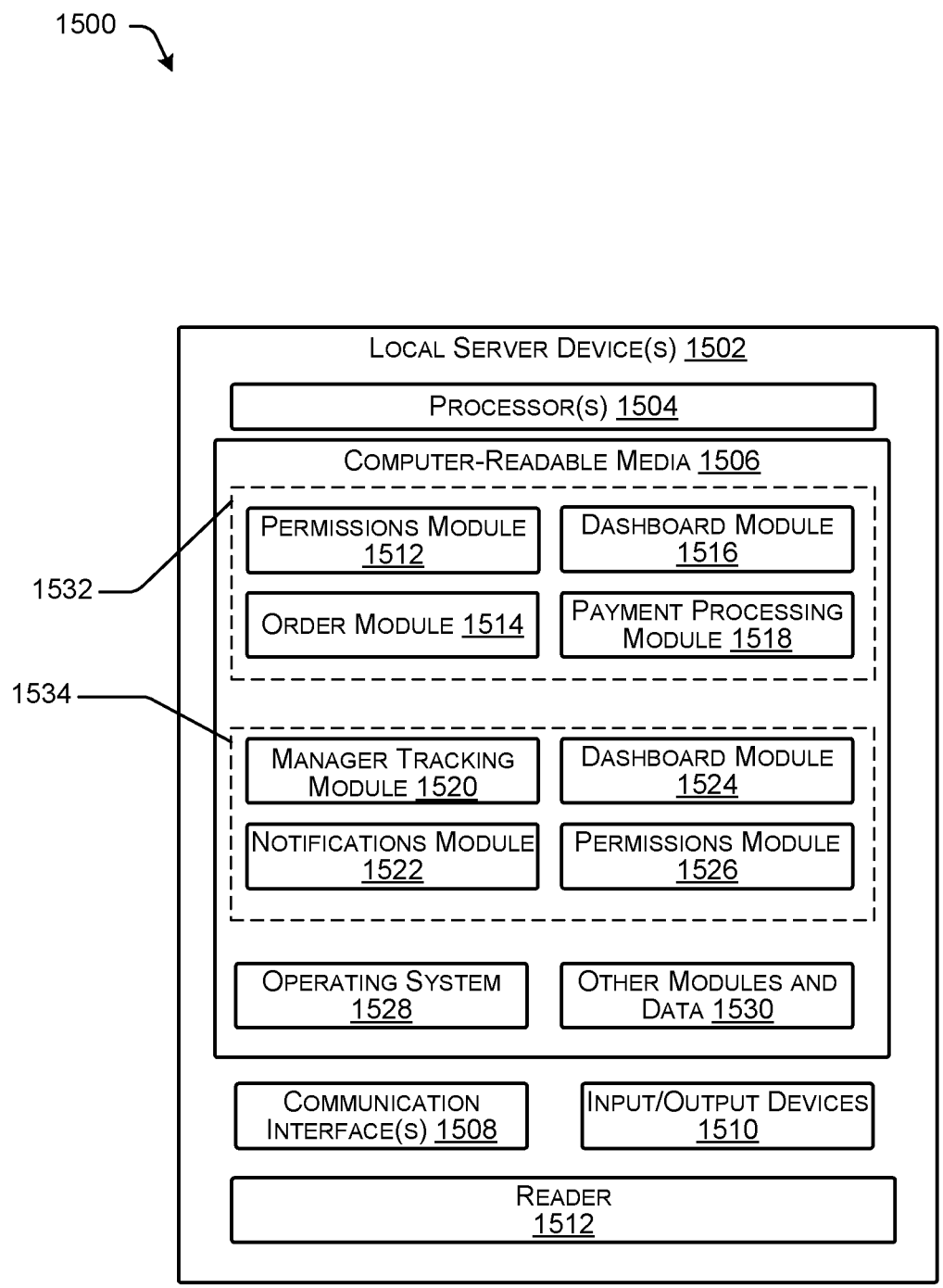
FIG. 15 illustrates a block diagram of select components of local server device(s), as described herein.

FIG. 15 illustrates a block diagram 1500 of select components of a local server device, as described herein.

Local server device 1502 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of local server device 1502 as being present in a single location, these components and data can alternatively be distributed across different computing devices and different locations in any manner. Consequently, the functions can be implemented by one or more local server devices, with the various functionality described above distributed in various ways across the different computing devices. Multiple local server devices 1502 can be located together or separately, and organized, for example, as virtual servers, server banks, and/or server farms. The described functionality can be provided by the servers of a single entity or enterprise, or can be provided by the servers and/or services of multiple different customers or enterprises.

In the illustrated example, local server device 1502 can include one or more processors 1504, one or more computer-readable media 1506, one or more communication interfaces 1508, one or more input/output devices 1510, and one or more card readers 1512. Each of the one or more processors 1504 can be a single processing unit or a number of processing units, and can include single or multiple computing units or multiple processing cores. The one or more processors 1504 can be implemented as one or more microprocessors, microcomputers, microcontrollers, digital signal processors, central processing units, state machines, logic circuitries, and/or any devices that manipulate signals based on operational instructions. For example, one or more processors 1504 can be one or more hardware processors and/or logic circuits of any suitable type specifically programmed or configured to execute the algorithms and processes described herein. One or more processors 1504 can be configured to fetch and execute computer-readable instructions stored in computer-readable media 1506, which can program one or more processors 1504 to perform the functions described herein.

Computer-readable media 1506 can include volatile and nonvolatile memory and/or removable and non-removable media implemented in any type of technology for storage of information, such as computer-readable instructions, data structures, program modules, or other data. Such computer-readable media 1506 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of local server device 1502, computer-readable media 1506 can be a type of computer-readable storage media and/or can be a tangible non-transitory media to the extent that when mentioned, non-transitory computer-readable media exclude media such as energy, carrier signals, electromagnetic waves, and signals per se.

Computer-readable media 1506 can be used to store any number of functional components that are executable by one or more processors 1504. In many implementations, these functional components comprise instructions or programs that are executable by one or more processors 1504.

Functional components stored in computer-readable media 1506 can include a permissions module 1512, an order module 1514, a dashboard module 1516, and a payment processing module 1518, which can comprise at least a portion of a point-of-sale (POS) application 1532. Permissions module 1512, order module 1514, dashboard module 1516, and payment processing module 1518 and the POS application 1532 can correspond to permissions module 212, order module 216, dashboard module 214, and payment processing module 218 of POS application 208, as described above with reference to FIG. 2.

Functional components stored in computer-readable media 1506 can additionally include a manager tracking module 1520, a notifications module 1522, a dashboard module 1524, and a permissions module 1526, which can comprise at least a portion of a manager application 1534. Notifications module 1522, dashboard module 1524, and permissions module 1526 and the manager application 1534 can correspond to notifications module 226, dashboard module 224, and permissions module 222 of manager application 210, as described above with reference to FIG. 2.

Additional functional components stored in computer-readable media 1506 can include operating system 1528 for controlling and managing various functions of local server device 1502. In at least one example, computer-readable media 1506 can additionally include or maintain other functional components and data, such as other modules and data 1530, which can include programs, drivers, etc., and the data used or generated by the functional components. Further, local server device 1502 can include many other logical, programmatic, and physical components, of which those described above are merely examples that are related to the discussion herein.

Communication interface(s) 1508 can include one or more interfaces and hardware components for enabling communication with various other devices, such as over network(s) or directly. For example, communication interface(s) 1508 can enable communication through one or more network, which can include, but are not limited to any type of network known in the art such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. A network can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Local server device 1502 can further be equipped with various input/output (110) devices 1510. Such I/O devices 1510 can include a display, various UI controls (e.g., buttons, joystick, keyboard, mouse, touch screen, etc.), audio speakers, connection ports and so forth.

In addition, local server device(s) 1502 can include or can be connectable to card reader 1512. In some examples, card reader 1512 can plug in to a port in local server device(s) 1502, such as a microphone/headphone port, a data port, or other suitable port. Card reader 1512 can include a read head for reading a magnetic strip of a payment card, and further can include encryption technology for encrypting the information read from the magnetic strip. Alternatively, numerous other types of card readers can be employed with local server device(s) 1502 herein, depending on the type and configuration of local server device(s) 1502.

Figure 16:
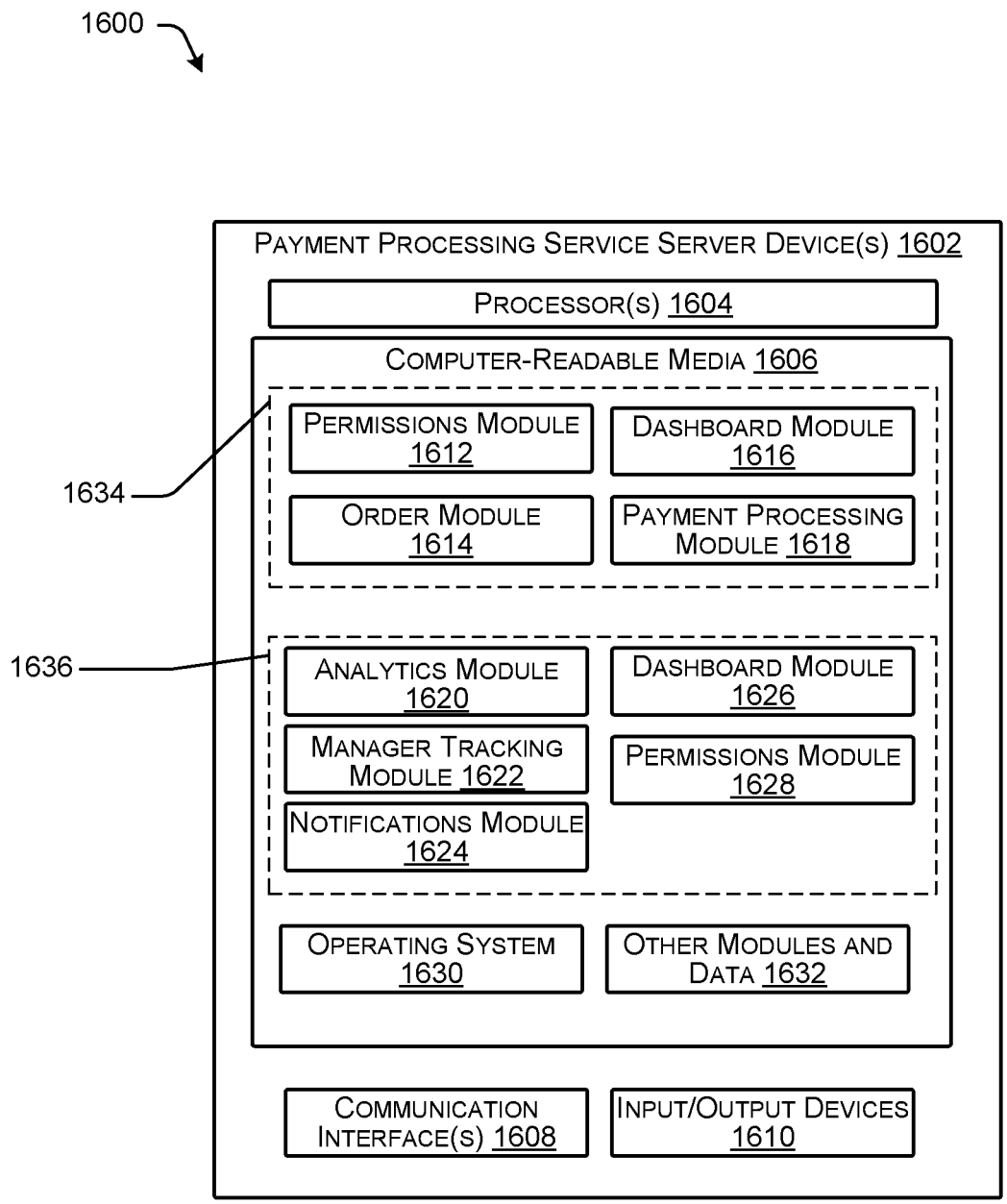
FIG. 16 illustrates a block diagram of select components of payment processing service server device(s), as described herein.

FIG. 16 illustrates a block diagram of select components of a payment processing service server device 1602, as described herein.

Payment processing service server devices 1602 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of payment processing service server device 1602 as being present in a single location, these components and data can alternatively be distributed across different computing devices and different locations in any manner. Consequently, the functions can be implemented by one or more local server devices, with the various functionality described above distributed in various ways across the different computing devices. Multiple payment processing service server devices 1602 can be located together or separately, and organized, for example, as virtual servers, server banks, and/or server farms. The described functionality can be provided by the servers of a single entity or enterprise, or can be provided by the servers and/or services of multiple different customers or enterprises.

In the illustrated example, payment processing service server device 1602 can include one or more processors 1604, one or more computer-readable media 1606, one or more communication interfaces 1608, and one or more input/output devices 1610. Each of the one or more processors 1604 can be a single processing unit or a number of processing units, and can include single or multiple computing units or multiple processing cores. The one or more processors 1604 can be implemented as one or more microprocessors, microcomputers, microcontrollers, digital signal processors, central processing units, state machines, logic circuitries, and/or any devices that manipulate signals based on operational instructions. For example, one or more processors 1604 can be one or more hardware processors and/or logic circuits of any suitable type specifically programmed or configured to execute the algorithms and processes described herein. One or more processors 1604 can be configured to fetch and execute computer-readable instructions stored in computer-readable media 1606, which can program one or more processors 1604 to perform the functions described herein.

Computer-readable media 1606 can include volatile and nonvolatile memory and/or removable and non-removable media implemented in any type of technology for storage of information, such as computer-readable instructions, data structures, program modules, or other data. Such computer-readable media 1606 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of payment processing service server device 1602, computer-readable media 1606 can be a type of computer-readable storage media and/or can be a tangible non-transitory media to the extent that when mentioned, non-transitory computer-readable media exclude media such as energy, carrier signals, electromagnetic waves, and signals per se.

Computer-readable media 1606 can be used to store any number of functional components that are executable by one or more processors 1604. In many implementations, these functional components comprise instructions or programs that are executable by one or more processors 1604. Functional components stored in computer-readable media 1606 can include a permissions module 1612, an order module 1614, a dashboard module 1616, and a payment processing module 1618, which can comprise at least a portion of a point-of-sale (POS) application 1634. Permissions module 1612, order module 1614, dashboard module 1616, and payment processing module 1618 and the POS application 1634 can correspond to permissions module 212, order module 216, dashboard module 214, and payment processing module 218 of POS application 208, as described above with reference to FIG. 2. Functional components stored in computer-readable media 1506 can additionally include an analytics module 1620, a manager tracking module 1622, a notifications module 1624, a dashboard module 1626, and a permissions module 1628, which can comprise at least a portion of a manager application 1636. Notifications module 1522, dashboard module 1524, and permissions module 1526 and the manager application 1534 can correspond to notifications module 226, dashboard module 224, and permissions module 222 of manager application 210, as described above with reference to FIG. 2.

Additional functional components stored in computer-readable media 1606 can include operating system 1630 for controlling and managing various functions of payment processing service server device 1602. In at least one example, computer-readable media 1606 can additionally include or maintain other functional components and data, such as other modules and data 1632, which can include programs, drivers, etc., and the data used or generated by the functional components. Further, payment processing service server device 1602 can include many other logical, programmatic, and physical components, of which those described above are merely examples that are related to the discussion herein.

Communication interface(s) 1608 can include one or more interfaces and hardware components for enabling communication with various other devices, such as over network(s) or directly. For example, communication interface(s) 1608 can enable communication through one or more network, which can include, but are not limited to any type of network known in the art such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. A network can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Payment processing service server device 1602 can further be equipped with various input/output (I/O) devices 1610. Such I/O devices 1610 can include a display, various UI controls (e.g., buttons, joystick, keyboard, mouse, touch screen, etc.), audio speakers, connection ports and so forth.

Figure 17:
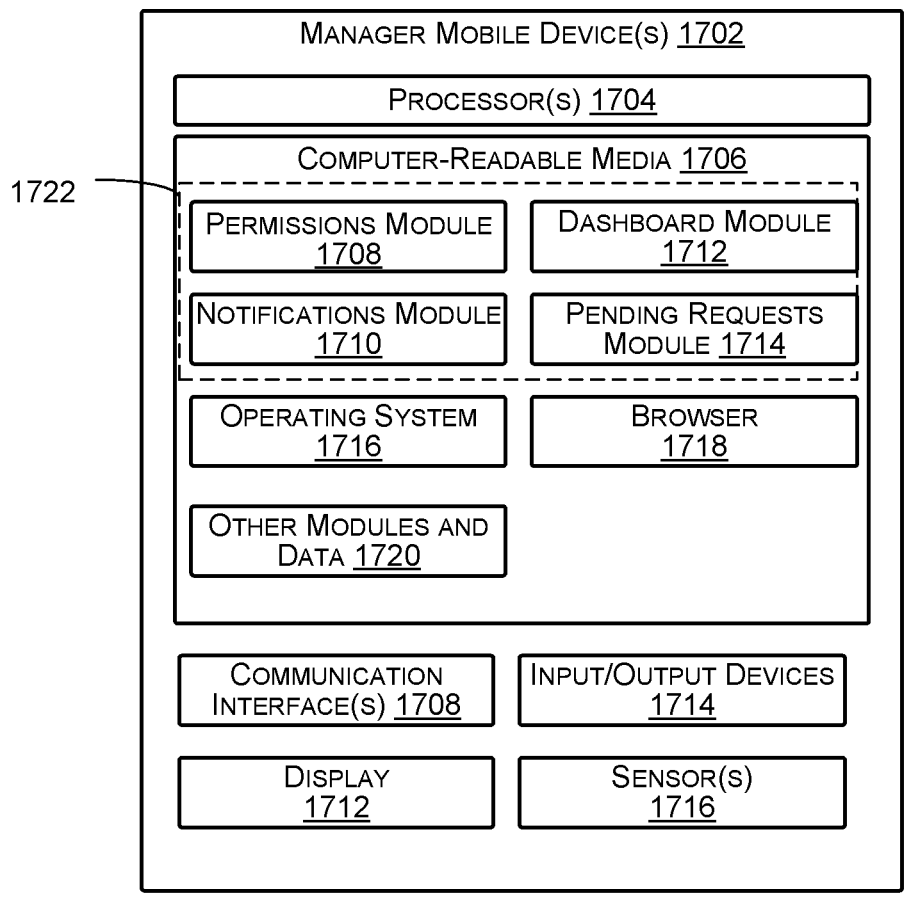
FIG. 17 illustrates a block diagram of select components of manager mobile device(s), as described herein.

FIG. 17 illustrates a block diagram of select components of a manager mobile device 1702, as described herein.

In at least one example, manager mobile device 1702 can be any suitable type of mobile device, e.g., portable, semi-portable, or semi-stationary. Some examples of manager mobile device 1702 can include tablet computing devices; smart phones and mobile communication devices; laptops, netbooks and other portable computers or semi-portable computers; wearable computing devices, or other body-mounted computing devices; augmented reality devices; or other computing devices capable of sending communications and performing the functions according to the techniques described herein.

In the illustrated example, manager mobile device 1702 can include one or more processors 1704, one or more computer-readable media 1706, one or more communication interfaces 1708, and one or more input/output (I/O) devices 1714. Each processor 1704 can itself include one or more processors or processing cores. For example, the one or more processors 1704 can be implemented as one or more microprocessors, microcomputers, microcontrollers, digital signal processors, central processing units, state machines, logic circuitries, and/or any devices that manipulate signals based on operational instructions. In some examples, the one or more processors 1704 can be one or more hardware processors and/or logic circuits of any suitable type specifically programmed or configured to execute the algorithms and processes described herein. The one or more processors 1704 can be configured to fetch and execute computer-readable processor-executable instructions stored in computer-readable media 1706.

Depending on the configuration of manager mobile device 1702, computer-readable media 1706 can be an example of tangible non-transitory computer storage media and can include volatile and nonvolatile memory and/or removable and non-removable media implemented in any type of technology for storage of information such as computer-readable processor-executable instructions, data structures, program modules or other data. Computer-readable media 1706 can include, but is not limited to, RAM, ROM, EEPROM, flash memory, solid-state storage, magnetic disk storage, optical storage, and/or other computer-readable media technology. Further, in some examples, manager mobile device 1702 can access external storage, such as RAID storage systems, storage arrays, network attached storage, storage area networks, cloud storage, or any other medium that can be used to store information and that can be accessed by the one or more processors directly or through another computing device or network. Accordingly, computer-readable media 1706 can be computer storage media able to store instructions, modules, or components that can be executed by the one or more processors 1704. Further, when mentioned, non-transitory computer-readable media exclude media such as energy, carrier signals, electromagnetic waves, and signals per se.

Computer-readable media 1706 can be used to store any number of functional components that are executable by one or more processors 1704. In many implementations, these functional components comprise instructions or programs that are executable by one or more processors 1704. Functional components stored in computer-readable media 1706 can additionally include a permissions module 1708, a notifications module 1710, a dashboard module 1712, and a pending requests module 1714 which can comprise at least a portion of a manager application 1722. Permissions module 1708, notifications module 1710, dashboard module 1712, and the manager application 1722 can correspond to permissions module 222, notifications module 226, dashboard module 224, and manager application 210, as described above with reference to FIG. 2.

Additional functional components stored in computer-readable media 1706 can include operating system 1716 for controlling and managing various functions of payment processing service server device 1702. In at least one example, computer-readable media 1706 can additionally include or maintain other functional components and data, such as other modules and data 1720, which can include programs, drivers, etc., and the data used or generated by the functional components. Further, payment processing service server device 1702 can include many other logical, programmatic, and physical components, of which those described above are merely examples that are related to the discussion herein. In addition, computer-readable media 1706 can also store data, data structures and the like, that are used by the functional components.

Communication interface(s) 1708 can include one or more interfaces and hardware components for enabling communication with various other devices, such as over network(s) or directly. For example, communication interface(s) 1708 can enable communication through one or more network, which can include, but are not limited to any type of network known in the art such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. A network can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Manager mobile device 1702 can further include one or more I/O devices 1714. I/O devices 1352 can include speakers, a microphone, a camera, and various user controls (e.g., buttons, a joystick, a keyboard, a keypad, etc.), a haptic output device, and so forth.

In at least one example, manager mobile device(s) 1702 can include display 1710. Depending on the type of computing device(s) used as manager mobile device(s) 1702, display 1712 can employ any suitable display technology. For example, display 1712 can be a liquid crystal display, a plasma display, a light emitting diode display, an OLED (organic light-emitting diode) display, an electronic paper display, or any other suitable type of display able to present digital content thereon. In some examples, display 1712 can have a touch sensor associated with display 1712 to provide a touchscreen display configured to receive touch inputs for enabling interaction with a graphic interface presented on display 1712. Accordingly, implementations herein are not limited to any particular display technology. Alternatively, in some examples, manager mobile device(s) 1702 may not include display 1712, and information can be presented by other means, such as aurally.

Other components included in manager mobile device 1702 can include a GPS device (not shown) that is able to indicate location information. Further, manager mobile device 1702 can include one or more sensors 1716, such as an accelerometer, gyroscope, compass, proximity sensor, camera, microphone, and/or a switch, as discussed above. Additionally, manager mobile device 1702 can include various other components that are not shown, examples of which include removable storage, a power source, such as a battery and power control unit, a printer, and so forth.

The present subject matter proposes the integration of at least the aforementioned features into a seamless and convenient mechanism for requesting and receiving manager approvals. With relation to the problems identified previously with conventional systems and methods, the software applications themselves become an active and cooperative component of the process, rather than the subject of it. Further, the aforementioned description is directed to devices and applications that are related to payment technology. However, it will be understood, that the technology can be extended to any device and application. Moreover, techniques described herein can be configured to operate irrespective of the kind of worker mobile device, mobile applications, POS topologies, local server device, payment processing service server device, computer networks, and environments. Techniques described herein can be configured to operate in both real-time/online and offline modes.

While the aforementioned disclosure makes reference to user interactions via a UI presented via a display of a device, the UI can be presented via any input/output device. As an example, the UI can be output via a speaker, and augmented reality projector, etc. Further, while the aforementioned disclosure makes reference to a worker or manager interacting with the UI via a selectable control, in additional or alternative examples, the worker or manager can indicate a selection via a spoken input or other type of input.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices, and methods, as shown and described herein. In any event, the structures, and devices, as well as the associated methods, described herein have many applications. Therefore, the disclosed subject matter should not be limited to any single example described herein, but rather should be construed in breadth and scope in accordance with the appended claims.

Various instructions, methods, and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

What is claimed is:

1. A system comprising:
one or more processors;
one or more non-transitory computer-readable media storing instructions that, when executed by the one or more processors, cause the one or more non-transitory computer-readable media to perform operations comprising:
obtaining a hierarchy of access levels, wherein a user of a plurality of users of a server application is assigned a user access level based on a relationship of the user with the server application;
obtaining, from a computing device of the user, a request to perform an action associated with a pending transaction, wherein the action is associated with an access level different from the user access level;
receiving, from an application executing on the computing device of the user, transaction data, wherein the transaction data indicates one or more first characteristics associated with the pending transaction;

responsive to a determination that at least one first characteristic satisfies a trigger condition, determining whether to change the user access level to an updated user access level based at least in part on output of a data model using, as input, the one or more first characteristics, wherein the data model has been trained using at least:
  first data indicating one or more second characteristics of transactions associated with individual historical requests of a plurality of historical requests for one or more actions, wherein an individual historical request is associated with a respective individual user of the plurality of users; and
  second data indicating whether the individual historical requests were approved; and
upon determining to change the user access level to an updated user access level, assigning the user the updated user access level, wherein assigning the user the updated access level enables the computing device of the user to perform the action.

2. The system as claim 1 recites, wherein the one or more first characteristics include a state of the transaction and wherein the trigger condition comprises the state of the transaction being substantially complete.

3. The system as claim 2 recites, wherein the instructions program the one or more processors to perform operations further comprising:
  determining that the state of the transaction is not substantially complete; and
  storing the request for a period of time;
  determining, at a later time, that the transaction is substantially complete; and
  changing the user access level to an updated user access level based at least in part on determining that the transaction is substantially complete.

4. The system as claim 1 recites, wherein the user comprises a first user, and wherein the action associated with a pending transaction comprises one or more of:
  sending funds to a third user on behalf of a second user;
  transferring loan obligations owed to the third user from the first user to the second user;
  approving invoices on behalf of the second user; or
  modifying one or more appointments on behalf of the second user.

5. The system as claim 1 recites, wherein the user access level describes one or more permissions required to access data, operate a specific device, interact with another user or another computing device, or perform a specific action.

6. The system as claim 1 recites, wherein determining to change the user access level to an updated user access level is further based in at least in part on:
  forwarding the request to perform the action to another application executable by a computing device of another user of the plurality of users; and
  receiving, by the computing device of the user and from the other application, an indication that approval from the other user has been provided to change the user access level to the updated user access level.

7. The system as claim 6 recites, wherein the user is a worker associated with a merchant and wherein the other user is a manager associated with the merchant.

8. The system as claim 6 recites, wherein forwarding the request includes causing presentation of the request on the computing device of the other user.

9. The system as claim 1 recites, wherein the user comprises a worker associated with a merchant.

10. The system as claim 1 recites, wherein the computing device of the user is a mobile point-of-sale (POS) device that submits payment data to a payment processing service for processing of a payment.

11. The system as claim 1 recites, wherein assigning the user the updated access level comprises temporarily assigning the user the updated access level.

12. The system as claim 1 recites, wherein the instructions program the one or more processors to perform operations further comprising:
  transmitting, to the computing device of the user, an indication of assignment of the updated user access level to the user, the action being performed by the computing device of the user based on the updated user access level.

13. The system as claim 1 recites, wherein the at least one first characteristic comprises at least one of a total spend of a transaction associated with the action or a period of time that a ticket associated with the transaction is open.

14. The system as claim 1 recites, wherein the action that the user indicates a desire to perform is removal of a charge from a ticket of a customer associated with the user.

15. The system as claim 1 recites, wherein the one or more second characteristics of the plurality of historical requests comprise at least one of a requestor, a requested action, a dollar amount associated with the transaction, or an identity of a party to the transaction.

16. A computer-implemented method comprising:
  obtaining a hierarchy of access levels, wherein a user of a plurality of users of a server application is assigned a user access level based on a relationship of the user with the server application;
  obtaining, from a computing device of the user, a request to perform an action associated with a pending transaction, wherein the action is associated with an access level different from the user access level;
  receiving, from an application executing on the computing device of the user, transaction data indicating one or more first characteristics associated with the pending transaction;
  responsive to a determination that at least one first characteristic satisfies the trigger condition, determining whether to change the user access level to an updated user access level based at least in part on output of a data model using, as input, the one or more first characteristics, wherein the data model has been trained using at least:
    first data indicating one or more second characteristics of transactions associated with individual historical requests of a plurality of historical requests for one or more actions, wherein an individual historical request is associated with a respective individual user of the plurality of users; and
    second data indicating whether the individual historical requests were approved; and
  upon determining to change the user access level to an updated user access level, assigning the user the updated user access level, wherein assigning the user the updated access level enables the computing device of the user to perform the action.

17. The computer-implemented method as claim 16 recites, wherein the user comprises a worker at a location of a merchant.

18. The computer-implemented method as claim 16 recites, wherein assigning the user the updated user access level is performed either (a) automatically by a computing device associated with the server application, or (b) manually by a computing device of another user of the plurality of users.

19. One or more non-transitory computer-readable media storing instructions that, when executed by one or more processors, cause the one or more non-transitory computer-readable media to perform operations comprising:

obtaining a hierarchy of access levels, wherein a user of a plurality of users of a server application is assigned a user access level based on a relationship of the user with the server application;

obtaining, from a computing device of the user, a request to perform an action associated with a pending transaction, wherein the action is associated with an access level different from the user access level;

receiving, from an application executing on the computing device of the user, data indicating one or more first characteristics of the context of the request;

responsive to a determination that at least one first characteristic indicates that a trigger event has occurred, prioritizing the request over one or more other requests;

determining whether to change the user access level to an updated user access level based at least in part on output of a data model using, as input, the one or more first characteristics, wherein the model has been trained using at least:

first data indicating one or more second characteristics of the contexts of individual historical requests of a plurality of historical requests for one or more actions, wherein an individual historical request is associated with a respective individual user of the plurality of users; and second data indicating whether the individual historical requests were approved; and upon determining to change the user access level to an updated user access level, assigning the user the updated user access level, wherein assigning the user the updated access level enables the computing device of the user to perform the action.

20. The one or more non-transitory computer-readable media as claim 19 recites, wherein assigning the user the updated access level comprises temporarily assigning the user the updated access level.

* * * * *